(12) United States Patent
Menichetti et al.

(10) Patent No.: US 6,272,826 B1
(45) Date of Patent: Aug. 14, 2001

(54) METHOD AND APPARATUS FOR POSITIONING A HAY RAKE

(75) Inventors: Silvano Menichetti, Umbertide; Sauro Petturiti, Citta di Castello, both of (IT)

(73) Assignee: Sitrex S.r.l., Trestina (IT)

( * ) Notice: Subject to any disclaimer, the term of this patent is extended or adjusted under 35 U.S.C. 154(b) by 0 days.

(21) Appl. No.: 09/302,227

(22) Filed: Apr. 29, 1999

(51) Int. Cl.$^7$ .................................................. A01D 79/00
(52) U.S. Cl. .................................................. 56/367; 56/370
(58) Field of Search ........................... 56/320, 365, 366, 56/367, 368, 384, 396, 392, 228, 10.9, 14.9, 15.9, 15.1, 372, DIG. 10, DIG. 11, DIG. 21

(56) References Cited

U.S. PATENT DOCUMENTS

| | | | |
|---|---|---|---|
| 3,208,536 | 9/1965 | Orendorff | 172/456 |
| 3,498,387 | 3/1970 | Roth | 172/456 |
| 3,546,867 | 12/1970 | Hauser-Lienhard | 56/370 |

(List continued on next page.)

OTHER PUBLICATIONS

Advertising Materials, M&W SR320P Rotary Hay Rake, No Date, M W Gear Co.
Advertising Materials, Kuhn GA Gyrorakes, No Date.
Advertising Materials, Tonutti s.p.a. Rotary Rakes, Sep. 1991.

*Primary Examiner*—Thomas B. Will
*Assistant Examiner*—Árpád Fábián Kovács
(74) *Attorney, Agent, or Firm*—Kenyon & Kenyon

(57) ABSTRACT

An apparatus for positioning a hay rake where the hay rake includes a gearbox with a central nonrotating part, a peripheral rotating part, and rake arms attached to the peripheral rotating part. In one embodiment of the present invention, the apparatus includes an actuator where the actuator is mounted above the gearbox. A support frame is mounted below the gearbox and is movable between a first lower position and a second upper position. A connecting member is disposed through a bore in the central nonrotating part of the gearbox and is coupled at its upper end to the actuator and at its lower end to the support frame. The support frame is movable to its second upper position in response to a force imparted to it by the actuator through the connecting member. Additionally, the invention may include a tow bar assembly. The tow bar assembly has a rear extended part connected to the gearbox. A central extended part is connected to the rear extended part. The central extended part is moveable with respect to the rear extended part and the rear extended part is positionable at a first lower position and a second upper position as a result of movement of the central extended part. A second actuator may be included with the tow bar assembly where the second actuator moves the central extended member.

65 Claims, 15 Drawing Sheets

U.S. PATENT DOCUMENTS

| | | | |
|---|---|---|---|
| 3,645,077 | 2/1972 | Hauser-Lienhard | 56/366 |
| 3,650,101 | 3/1972 | Aron | 56/370 |
| 3,814,191 | 6/1974 | Tilbury | 172/311 |
| 3,832,838 | 9/1974 | Hale | 56/377 |
| 3,936,994 | 2/1976 | Mortier et al. | 56/228 |
| 3,995,416 | 12/1976 | van der Lely | 56/370 |
| 4,015,412 | 4/1977 | Reber | 56/370 |
| 4,043,099 | 8/1977 | Cheatum | 56/10.9 |
| 4,144,699 | 3/1979 | Aron | 56/370 |
| 4,149,364 | 4/1979 | Aron | 56/366 |
| 4,161,860 | 7/1979 | van der Lely | 56/370 |
| 4,202,160 | 5/1980 | van der Lely | 56/366 |
| 4,245,457 | 1/1981 | Gerlinger | 56/370 |
| 4,274,249 | 6/1981 | Hauser | 56/370 |
| 4,275,552 | 6/1981 | DeCoene | 56/370 |
| 4,286,427 | 9/1981 | van der Lely | 56/377 |
| 4,288,972 | 9/1981 | Rostoucher | 56/370 |
| 4,345,422 * | 8/1982 | Amstutz | 56/370 |
| 4,370,846 | 2/1983 | Arnold | 56/6 |
| 4,457,127 | 7/1984 | Maier et al. | 56/192 |
| 4,529,040 | 7/1985 | Grollimund | 172/311 |
| 4,555,897 | 12/1985 | Degelman | 56/228 |
| 4,621,487 | 11/1986 | Urlacher et al. | 56/228 |
| 4,628,673 | 12/1986 | Aron | 56/370 |
| 4,641,491 | 2/1987 | van der Lely et al. | 56/228 |
| 4,656,821 | 4/1987 | Aron | 56/370 |
| 4,693,065 | 9/1987 | Aron et al. | 56/377 |
| 4,723,402 | 2/1988 | Webster et al. | 56/377 |
| 4,753,063 | 6/1988 | Buck | 56/377 |
| 4,785,614 | 11/1988 | Schoenherr | 56/365 |
| 4,875,332 | 10/1989 | Aron | 56/377 |
| 4,905,466 | 3/1990 | Heppner | 56/364 |
| 4,914,901 | 4/1990 | Aron | 56/370 |
| 4,920,735 | 5/1990 | Bailey et al. | 56/14.9 |
| 4,922,700 | 5/1990 | Aron | 56/370 |
| 4,953,346 | 9/1990 | Aron | 56/11.1 |
| 4,974,407 | 12/1990 | Rowe et al. | 56/377 |
| 4,976,095 | 12/1990 | Schittjer | 56/350 |
| 4,977,734 | 12/1990 | Rowe et al. | 56/384 |
| 5,024,053 | 6/1991 | Aron | 56/367 |
| 5,060,465 | 10/1991 | Jérôme | 56/367 |
| 5,127,216 | 7/1992 | Kelderman | 56/15.9 |
| 5,155,986 | 10/1992 | Kelderman | 56/365 |
| 5,163,277 | 11/1992 | Fransgaard | 56/366 |
| 5,199,252 | 4/1993 | Peeters | 56/377 |
| 5,231,829 | 8/1993 | Tonutti | 56/377 |
| 5,263,306 | 11/1993 | Tonutti | 56/377 |
| 5,274,990 | 1/1994 | Aron et al. | 56/377 |
| 5,305,590 | 4/1994 | Peeters | 56/377 |
| 5,313,772 | 5/1994 | Tonutti | 56/377 |
| 5,377,482 | 1/1995 | Krigge | 56/370 |
| 5,479,768 | 1/1996 | Hettich | 56/365 |
| 5,493,853 | 2/1996 | Tonutti | 56/377 |
| 5,502,959 | 4/1996 | Hansen | 56/370 |
| 5,546,739 | 8/1996 | Hettich | 56/367 |
| 5,586,421 | 12/1996 | Aron | 56/367 |
| 5,685,136 | 11/1997 | Aron | 56/367 |
| 5,791,133 | 8/1998 | Krone et al. | 56/367 |
| 5,911,554 * | 6/1999 | Rokitta et al. | 414/306 |
| 5,918,451 * | 7/1999 | Vonesch | 56/365 |
| B1 4,974,407 | 1/1994 | Rowe et al. | 56/384 |

* cited by examiner

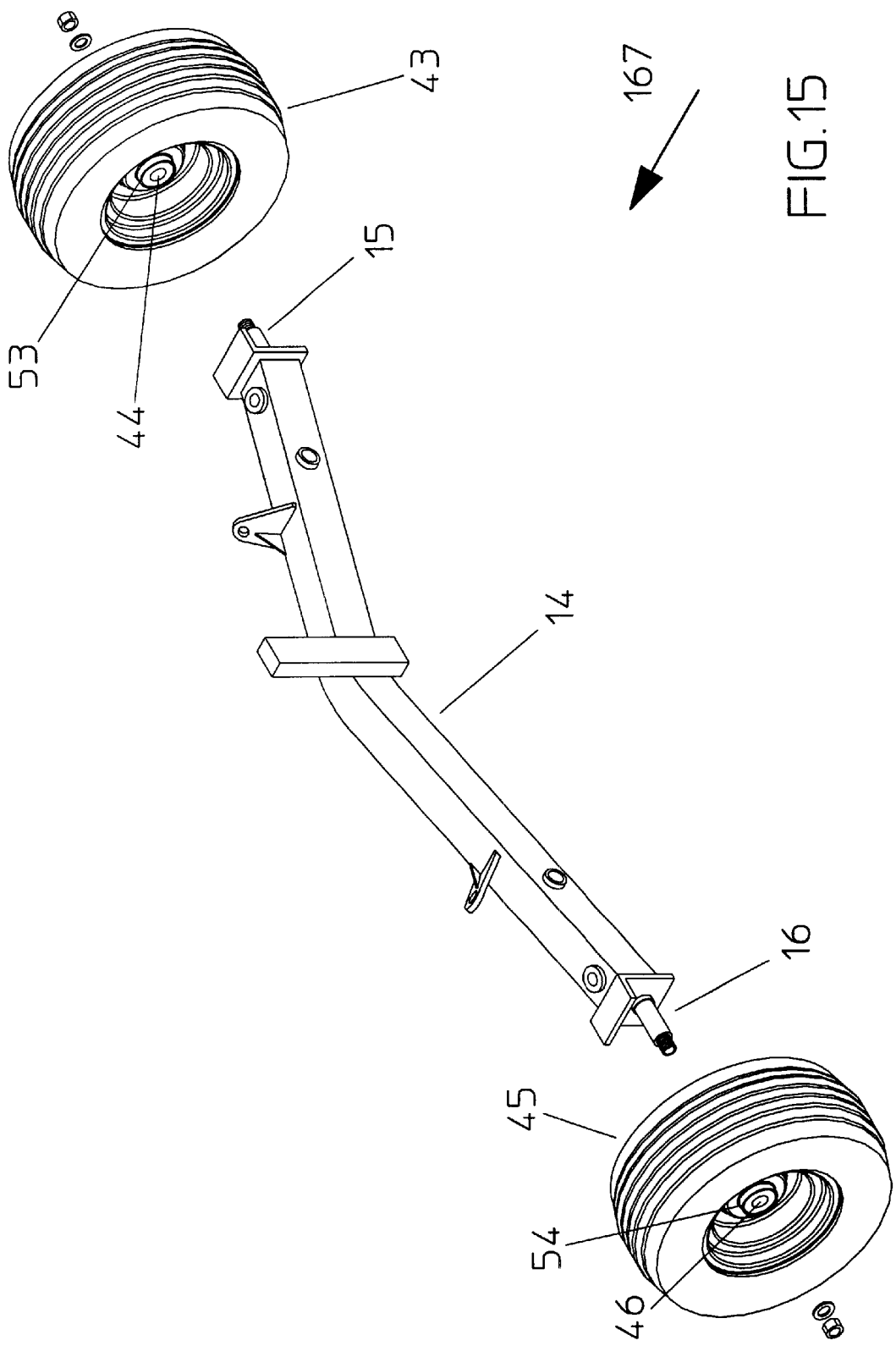

METHOD AND APPARATUS FOR POSITIONING A HAY RAKE

FIELD OF THE INVENTION

The present invention relates to a hay rake for raking and stacking forage. More specifically, the present invention provides an improved apparatus and method for positioning the towed hay rake in a lower working position and an upper maneuvering and transport position.

BACKGROUND OF THE INVENTION

Towed rotary hay rakes for raking and stacking forage with both mechanical and hydraulic hoisting, or positioning, apparatuses currently exist. Such rakes typically consist of a rotary gearbox which rotates a set of rake arms positioned like spokes of a wheel about a common axis, a towbar to affix the rake to a tractor, and a wheeled support structure below the gearbox to support the gearbox and facilitate movement of the rake. During operation, the rake arms typically sweep completely around the wheel base of the support structure.

As is well-known, a feature that these rotary hay rakes have in common is the ability to assume different positions. In particular, the rake arms, which have the function of raking the forage, can be lowered to a working position so that the tips of the rake arms contact the crop for the raking operation and can be raised to an upper position for maneuvering and transport on the roadway.

The currently known positioning systems, whether mechanical or hydraulic, have drawbacks, however. Specifically, those rotary hay rakes with mechanical hoisting apparatuses generally possess only a limited range of movement and are difficult to maneuver. Furthermore, the operator may be required to get off of the tractor which tows the hay rake in order to operate the hoisting apparatus. Other currently known rotary hay rakes have hydraulic hoisting apparatuses, but these apparatuses are not optimally mounted on the hay rake. Because of difficulties in transferring power from above the gearbox of the rotary hay rake to a mechanism located on the support frame below the gearbox, a known hydraulic lifting mechanism for raising and lowering the hay rake includes a hydraulic cylinder that is mounted underneath the gearbox. Such positioning, however, is inconvenient and undesirable because the underside of the gearbox is not easily accessible.

Another problem with currently known positioning devices, whether mechanically or hydraulically operated, is that they do not always position the hay rake, in particular the rake arms, in an orientation which is parallel to the ground, as is desirable for optimal functioning. Because the hay rake is attached to the towing tractor by means of a tow bar, the orientation of the tow bar with respect to the tractor and the hay rake can deleteriously affect the positioning of the hay rake. For example, the tow bar tends to vary the hay rake's longitudinal inclination according to the greater or lesser height at which the tow bar has been attached to the tractor and according to the greater or lesser length of the tow bar. Therefore, it may not be possible to position the hay rake, in particular the rake arms, in a parallel orientation to the ground.

Whereas fine adjustment apparatuses may be available for adjusting the longitudinal inclination of the hay rake to overcome the tow bar effects addressed above, these types of adjustment apparatuses have drawbacks as well. Although the apparatuses may be effective at leveling the hay rake's trim when the hay rake is in the lower work position, they are not able to adjust for variations in the hay rake's inclination, which cause it not to be positioned parallel to the ground, after the hay rake has been moved to the upper maneuvering and transport position.

The problems described above are solved by the rake positioning apparatus of the present invention, which provides for an improved mounting location for an actuator included in the positioning apparatus, e.g., an easily accessible hydraulic cylinder which is mounted above the gearbox of the hay rake, a means for maintaining the hay rake in a parallel orientation to the ground when it is in both the lower working position and the upper maneuvering and transport position, and the convenience and practicality of remote control which is typical of hydraulic controls, thus eliminating any need for the operator to get down from the tractor and approach the hay rake to operate it or adjust it.

SUMMARY OF THE INVENTION

An apparatus for positioning a rotary hay rake where the hay rake includes a gearbox with a central nonrotating part, a peripheral rotating part, and side-delivery rake arms attached to the peripheral rotating part is provided. In one embodiment of the present invention, the apparatus includes an actuator where the actuator is mounted above the gearbox. A support frame is mounted below the gearbox and is movable between a first lower position and a second upper position. A connecting member is disposed through a bore in the central nonrotating part of the gearbox and is coupled at its upper end to the actuator and at its lower end to the support frame. The support frame is movable to its second upper position in response to a force imparted to it by the actuator through the connecting member.

Additionally, the invention may include a tow bar assembly. The tow bar assembly has a rear extended part having a first end and a second end where the first end is connected to structure associated with the gearbox. A central extended part having a first end and a second end is connected to the second end of the rear extended part at its second end. The central extended part is moveable with respect to the rear extended part and the rear extended part is positionable at a first lower position and a second upper position as a result of movement of the central extended part.

A second actuator may be included in the tow bar assembly where the second actuator is attached at a first end to the rear extended part and is coupled to the central extended part at a second end. The rear extended part is positioned in its second upper position in response to a force imparted to the central extended member by the second actuator.

The invention also includes a rotary hay rake comprising the improved hay rake positioning apparatus and/or tow bar assembly.

BRIEF DESCRIPTION OF THE DRAWINGS

The various features of the invention will best be appreciated by simultaneous reference to the description which follows and the accompanying drawings, in which:

FIG. 15 is a disassembled perspective view of an alternative embodiment for a carriage assembly.

DETAILED DESCRIPTION

Figure 1:
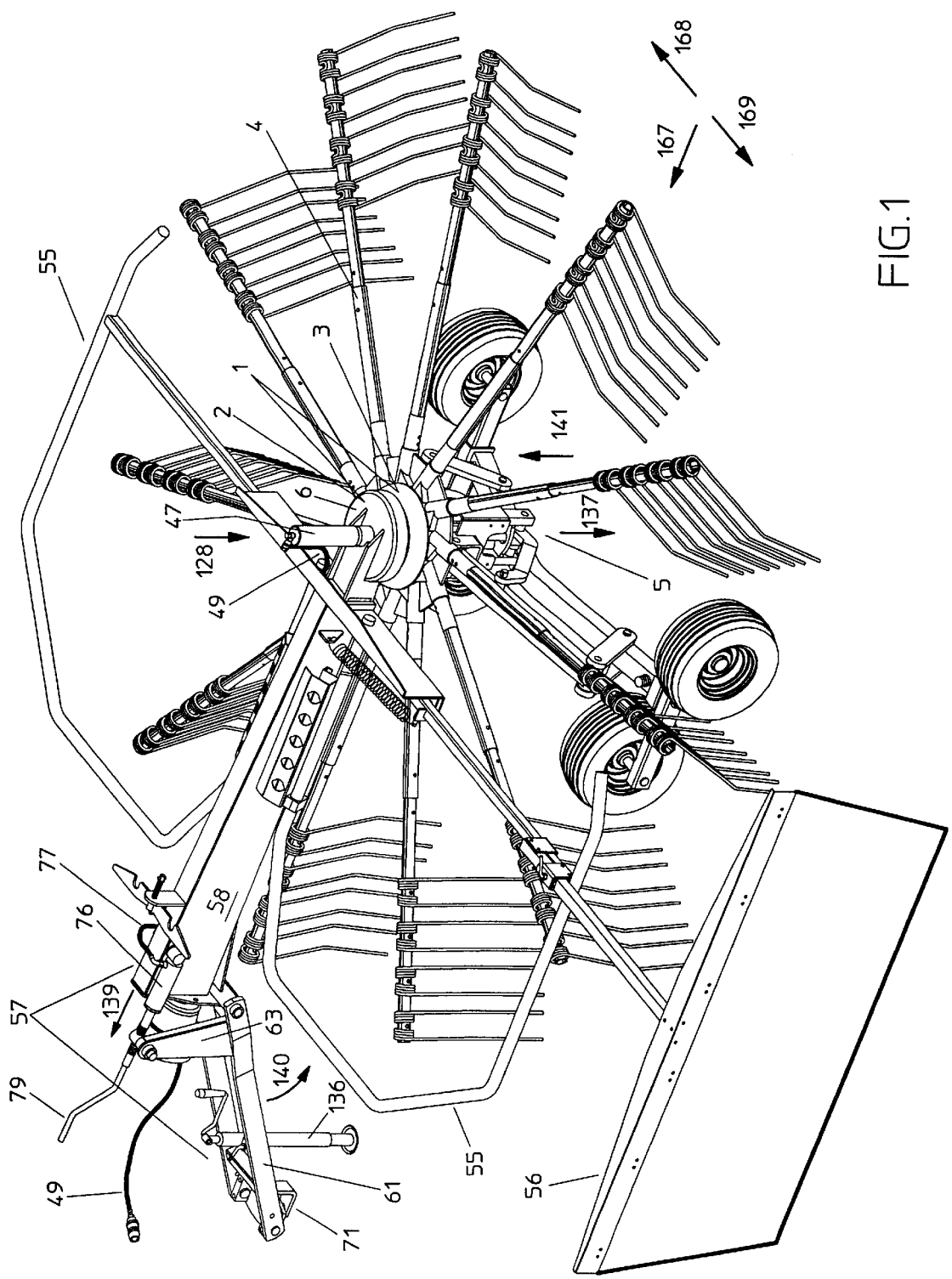
FIG. 1 is a perspective view of a hay rake assembly and an embodiment of a hay rake assembly positioning apparatus in accordance with the principles of the present invention.

FIG. 1 illustrates a hay rake assembly and a first embodiment for a hay rake assembly positioning apparatus in accordance with the principles of the present invention. As can be seen in FIG. 1, a hay rake includes a gearbox 1 which has a central nonrotating part 2 and a peripheral rotating part 3. Rake arms 4 are attached to the peripheral rotating part 3. A non-working end of rake arms 4 may be inserted within the peripheral rotating part 3 and may be retained within the rotating part 3 by utilizing a cotter-type pin which extends through the rotating part and the rake arm. Gearbox 1 receives the motive force required for its functioning from a drive shaft extending from a towing tractor (not visible in FIG. 1), as is well-known in the art. The central nonrotating part 2 of gearbox 1 includes an upper part 6 and a lower part 7 (not visible in FIG. 1 but which can be seen in FIG. 2) and has a central vertical throughhole 48 (also visible in FIG. 2).

Figure 5:
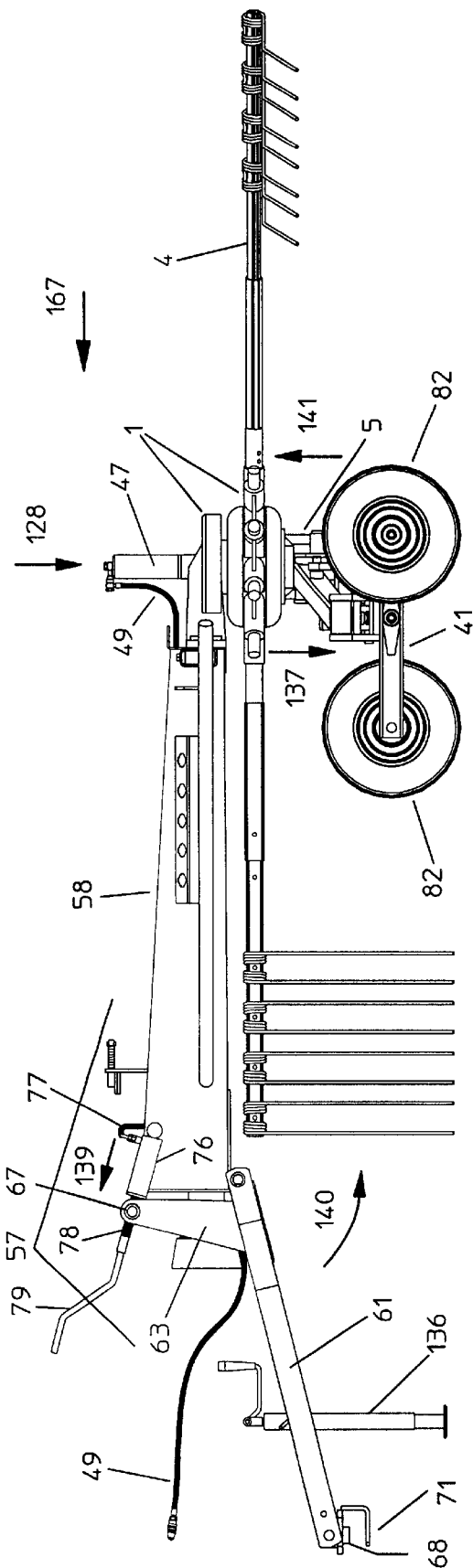
FIG. 5 is a side view of the hay rake assembly of FIG. 1 as positioned in a lower working position.
Figure 6:
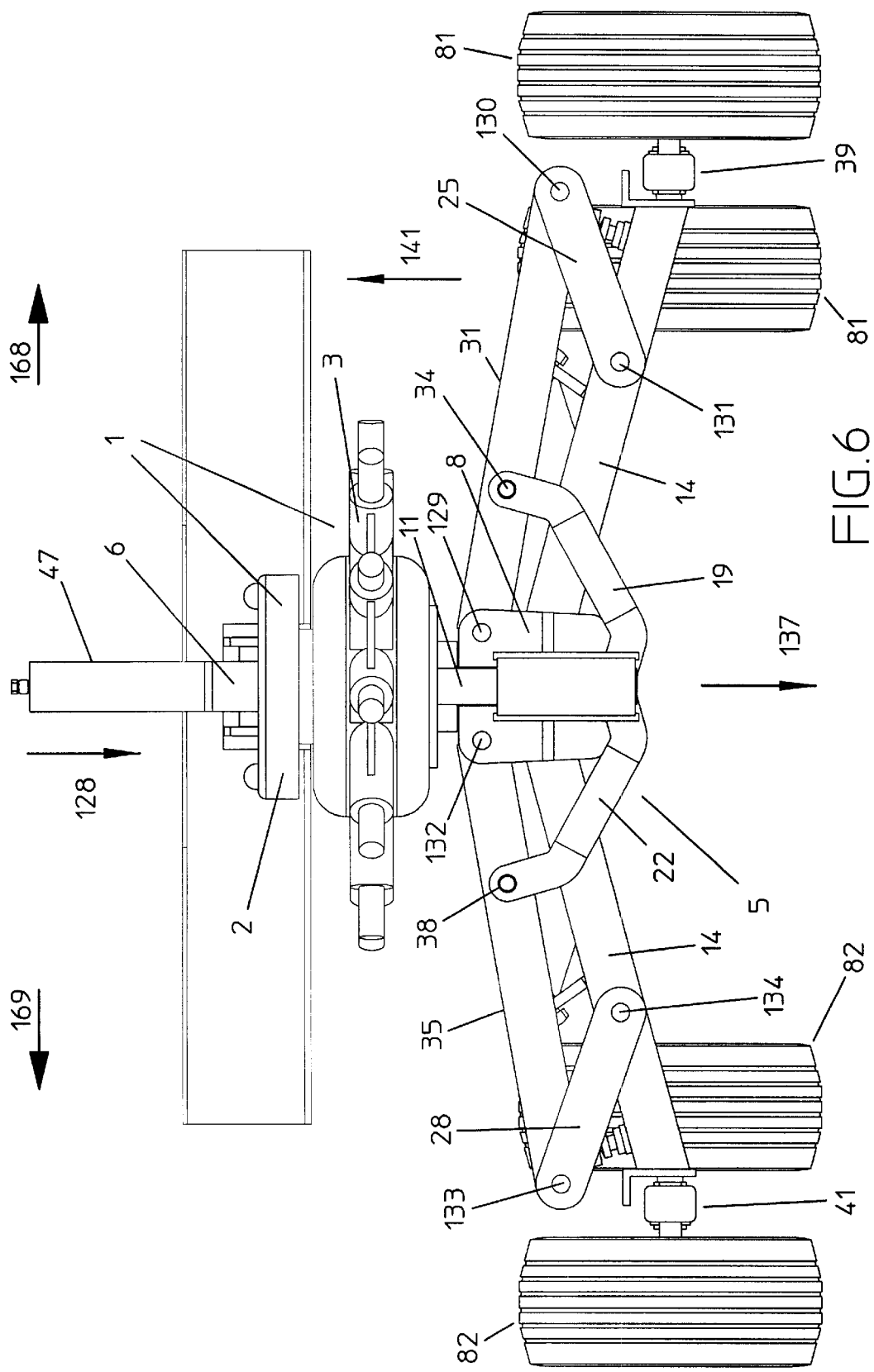
FIG. 6 is a rear view of the hay rake assembly of FIG. 5.
Figure 7:
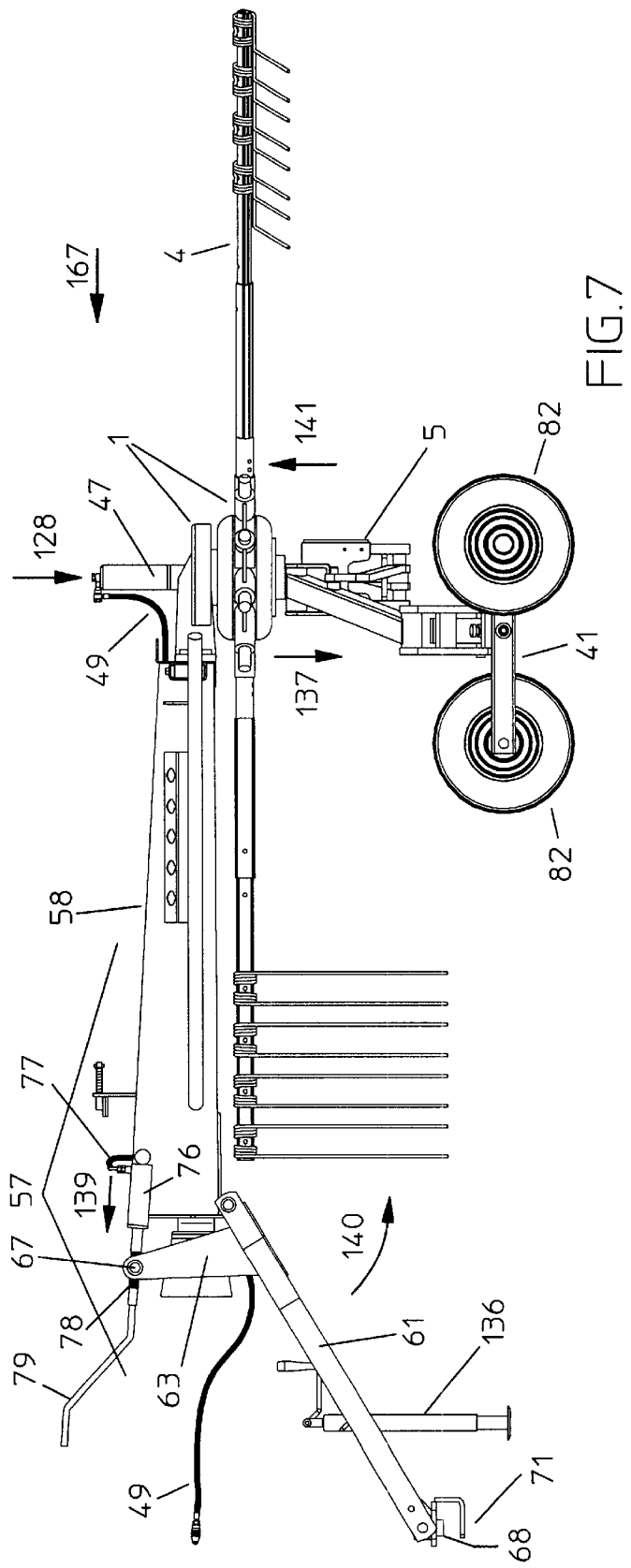
FIG. 7 is a side view of the hay rake assembly of FIG. 1 as positioned in an upper maneuvering and transport position.
Figure 8:
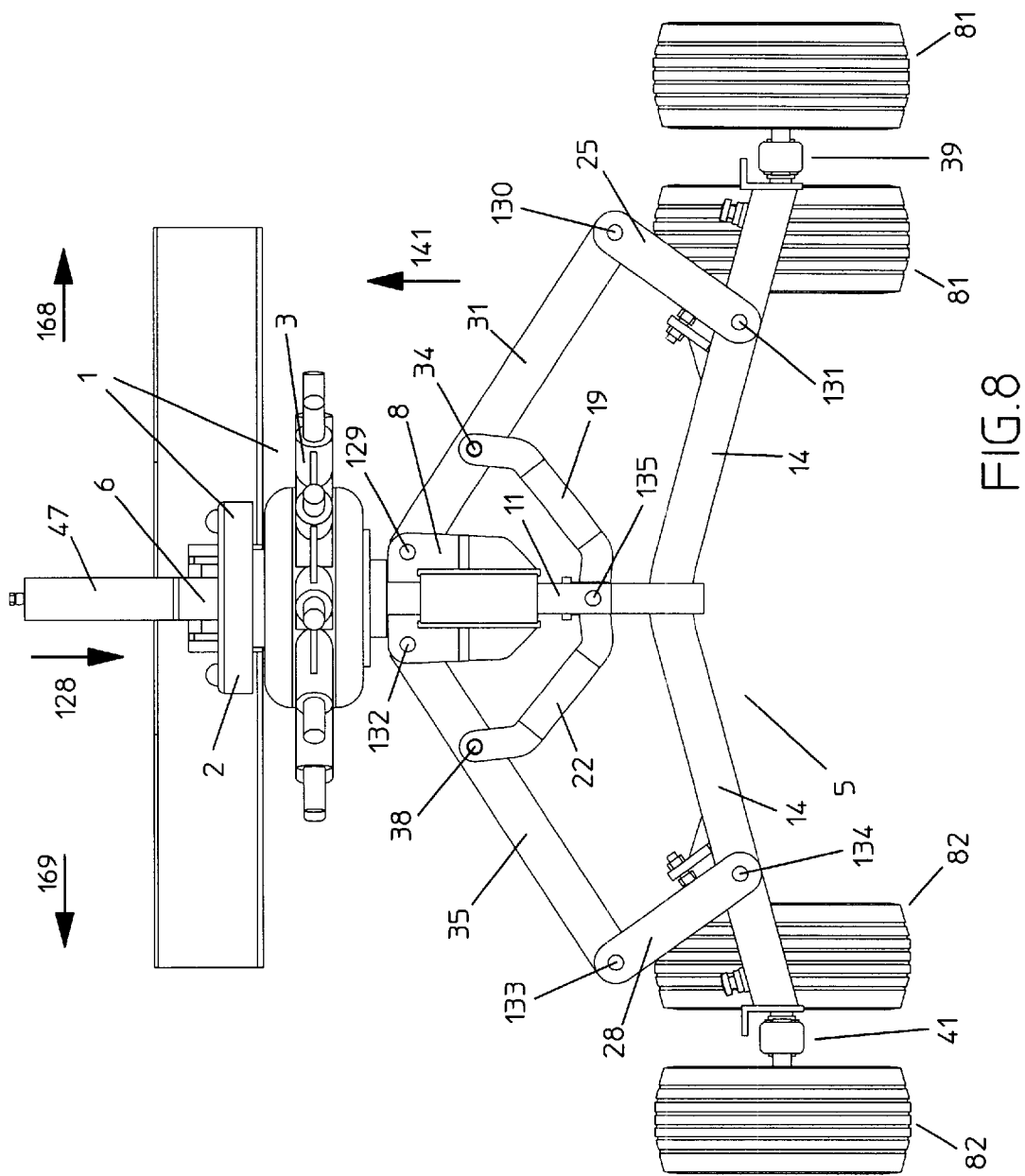
FIG. 8 is a rear view of the hay rake assembly of FIG. 7.

In one embodiment, a hay rake positioning apparatus includes an actuator, which may be single-acting hydraulic cylinder 47, which is mounted on the upper part 6 of the gearbox 1. Hydraulic tubes 49 provide hydraulic fluid to cylinder 47 to operate cylinder 47. Hydraulic cylinder 47 is connected to support frame 5 through a mechanism which extends through gearbox 1. The interaction between hydraulic cylinder 47, frame 5, and the mechanism that connects the hydraulic cylinder 47 to frame 5 serves to position the hay rake in either of two positions, one of which is a lower working position, as shown in FIGS. 5 and 6, and the other of which is an upper maneuvering and transport position, as shown in FIGS. 7 and 8, all of which will be further described later in this specification. Arrow 128 indicates the direction in which single-acting hydraulic cylinder 47 functions when it is activated.

Also shown in FIG. 1 are embodiments of a tow bar assembly 57 and a tow bar assembly positioning apparatus, both of which are part of the overall hay rake assembly. In this embodiment, tow bar assembly 57 includes a central extended part 61, a hitch 71 for attachment to a tractor for towing the hay rake assembly, and a rear extended part 58, which attaches to structure associated with gearbox 1, which could include the gearbox itself. The tow bar assembly positioning apparatus, in the illustrated embodiment, includes a single-acting hydraulic cylinder 76, a hydraulic tube 77 for operating cylinder 76, and a fine adjustment crank 79. Tow bar assembly 57 and the tow bar assembly positioning apparatus will be described in further detail when discussing FIG. 3. Arrow 139 indicates the direction in which single-acting hydraulic cylinder 76 functions when it is activated.

An upper protective frame 55 and a side tarpaulin 56 are included in the hay rake assembly of FIG. 1, as are well-known in the art. Many suitable types exist for these components and the present invention is not limited to being practiced with any particular type of these components.

For purposes of reference, the arrows 141, 167, 168, and 169 represent the up direction, the longitudinal direction, the right transverse direction, and the left transverse direction, respectively. As will be explained, the up direction 141 is also the direction of movement of gearbox 1 when it is raised away from the ground. The longitudinal direction 167 is also the hay rake assembly's towing direction.

Figure 2:
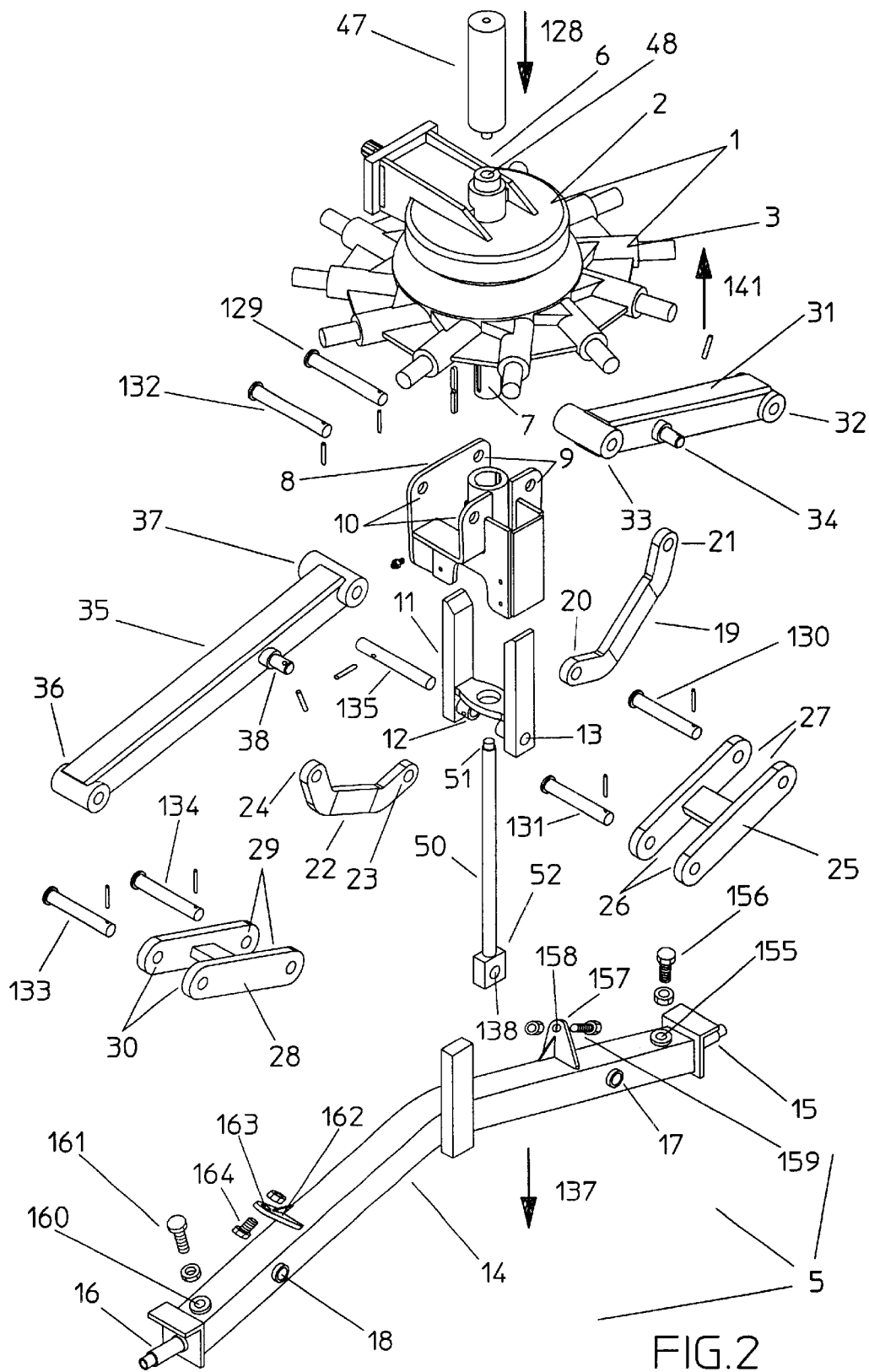
FIG. 2 is a disassembled perspective view of the hay rake positioning apparatus of FIG. 1.

The hay rake positioning apparatus will now be described in more detail with reference to FIG. 2. As can be seen in FIG. 2, and as was described previously, the hay rake positioning apparatus may include single-acting hydraulic cylinder 47, support frame 5, and a member that connects hydraulic cylinder 47 to support frame 5, i.e., vertical mobile rod 50.

As described previously, and as can be seen in FIG. 2, single-acting hydraulic cylinder 47 is positioned on the upper part 6 of the gearbox 1. The vertical mobile rod 50 has an upper end 51 and a lower end 52. Vertical mobile rod 50 is disposed through the central vertical throughhole 48 of the central nonrotating part 2, where the upper end 51 is attached to the hydraulic cylinder 47. The lower end 52 has a hole 138 through it which is utilized to attach mobile rod 50 to support frame 5, as will be described further below. Arrow 137 indicates the direction in which the vertical mobile rod 50 is moved by the single-acting hydraulic cylinder 47 when the single-acting hydraulic cylinder 47 is operated in the direction of the arrow 128.

In further describing a first embodiment for a support frame, as can be seen in FIG. 2, support frame 5 includes an upper central part 8, a lower central part 11, a lower transverse extended part 14, right and left central connecting rods 19 and 22, respectively, right and left lateral connecting rods 25 and 28, respectively, and upper right and left rods 31 and 35, respectively. Each of these components and their attachment to the other components of support frame 5 and mobile rod 50 will be described below.

Upper central part 8 is attached to the lower part 7 of the central nonrotating part 2 of the gearbox 1 and has two aligned holes 9 on a right end thereof which constitute a half hinge with a longitudinal axis and two aligned holes 10 on a left end thereof which also constitute a half hinge with a longitudinal axis. Lower central part 11 includes two aligned bushings 12 and 13, each of which constitute a half hinge with a longitudinal axis.

Lower transverse extended part 14 has a transverse pin 15 on its right end and a traverse pin 16 on its left end. On the right intermediate part of lower transverse extended part 14 there is a hole 155 which houses a screw 156 which functions as an end position, a tailpiece 157 which includes a hole 158 which houses a screw 159 which functions as an end position, and a hole 17 which constitutes a half hinge with a longitudinal axis. On the left intermediate part there is a hole 160 which houses a screw 161 which functions as an end position, a tailpiece 162 which includes a hole 163 which houses a screw 164 which functions as an end position, and a hole 18 which constitutes a half hinge with a longitudinal axis.

Right central connecting rod 19 has a left end that includes hole 20 which constitutes a half hinge that complements the half hinge consisting of bushing 13 of lower central part II and a right end with a longitudinal hole 21. Left central connecting rod 22 has a right end that includes hole 23 which constitutes a half hinge that complements the half hinge consisting of bushing 12 of lower central part 11 and a left end with a longitudinal hole 24.

Right lateral connecting rod 25 has a left end with two aligned holes 26 which constitute a half hinge that complements the half hinge consisting of the hole 17 of lower transverse extended part 14 and a right end that has two aligned holes 27 which constitute a half hinge with a longitudinal axis. Left lateral connecting rod 28 has a right end with two aligned holes 29 which constitute a half hinge that complements the half hinge consisting of the hole 18 of lower transverse extended part 14 and a left end that has two aligned holes 30 which constitute a half hinge with a longitudinal axis.

Upper right rod 31 has a bushing 33 on its left end which constitutes a half hinge that complements the half hinge consisting of the holes 9 of upper central part 8 and a bushing 32 on its right end which constitutes a half hinge that complements the half hinge consisting of the holes 27 of right lateral connecting rod 25. Upper right rod 31 also includes a longitudinal pin 34 in its central part which is positioned into hole 21 of right central connecting rod 19. Upper left rod 35 has a bushing 37 on its right end which constitutes a half hinge that complements the half hinge consisting of the holes 10 of upper central part 8 and a bushing 36 on its left end which constitutes a half hinge that complements the half hinge consisting of the holes 30 of left lateral connecting rod 28. Upper left rod 35 also includes a longitudinal pin 38 in its central part which is positioned into hole 24 of left central connecting rod 22.

Pins 129, 130, 131, 132, 133, 134, and 135 are utilized to connect the various components of support frame 5 together. Pin 129 is inserted through holes 9 of upper central part 8 and bushing 33 of upper right rod 31 to connect upper central part 8 to upper right rod 31. Pin 130 is inserted through holes 27 of right lateral connecting rod 25 and bushing 32 of upper right rod 31 to connect right lateral connecting rod 25 to upper right rod 31. Pin 131 is inserted through holes 26 of right lateral connecting rod 25 and hole 17 of lower transverse extended part 14 to connect right lateral connecting rod 25 to lower trasverse extended part 14. Pin 132 is inserted through holes 10 of upper central part 8 and bushing 37 of upper left rod 35 to connect upper central part 8 to upper left rod 35. Pin 133 is inserted through holes 30 of left lateral connecting rod 28 and bushing 36 of upper left rod 35 to connect left lateral connecting rod 28 to upper left rod 35. Pin 134 is inserted through holes 29 of left lateral connecting rod 28 and hole 18 of lower transverse extended part 14 to connect left lateral connecting rod 28 to lower transverse extended part 14. Lastly, pin 135 is inserted through bushing 13 of lower central part 11, hole 20 of right central connecting rod 19, hole 138 in the lower end 52 of vertical mobile rod 50, hole 23 in left central connecting rod 22, and through bushing 12 of lower central part 11. Thus, vertical mobile rod 50 is connected to lower central part 11 which is in-turn connected to right central connecting rod 19 and left central connecting rod 22. Vertical mobile rod 50 extends up through upper central part 8 and central vertical throughhole 48 of central nonrotating part 2 of gearbox 1 where its upper end 51 is attached to cylinder 47. The interconnection of the different components of support frame 5 can be further seen in FIGS. 6 and 8, both of which will be discussed later when describing the operation of the present invention.

Figure 3:
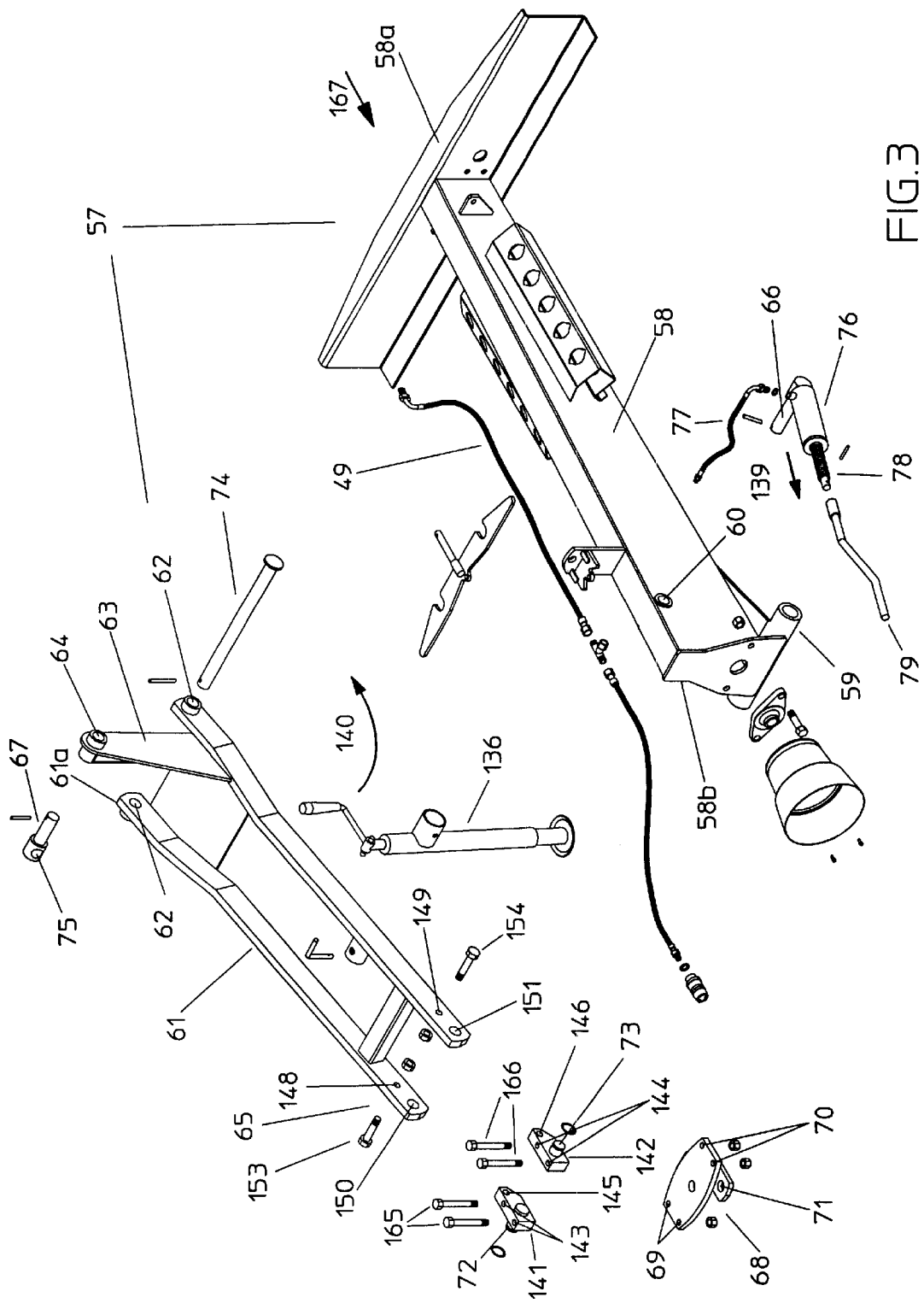
FIG. 3 is a disassembled perspective view of the adjustable tow bar assembly and tow bar assembly positioning apparatus of FIG. 1.

In further describing tow bar assembly 57 and the tow bar assembly positioning apparatus, reference is made to FIG. 3. As can be seen, tow bar assembly 57 includes a rear extended part 58, a central extended part 61, a front part 68, a right linking part 141, a left linking part 142, a hitch 71, and a support jack 136. Rear extended part 58 has a rear part 58a that can be attached to upper part 6 of central nonrotating part 2 of gearbox 1. Front end 58b includes a bushing 59 which constitutes a transverse axis half hinge and a transverse hole 60. As can also be seen in FIG. 3, rear extended part 58 may also include mounting brackets on each side of its longitudinal member. Each bracket may define a plurality of apertures therein. As can be understood, the mounting brackets may be used to store the rake arms 4 within them. When the rake arms are not being utilized (for example during transport or storage), they may be removed from the peripheral rotating part 3 and their non-working end inserted within the apertures of the mounting brackets to store the rake arms in a near-vertical orientation with respect to the longitudinal member.

Central extended part 61 of tow bar assembly 57 includes a rear end 61a on which are two aligned holes 62 which constitute a half hinge that complements the half hinge consisting of the bushing 59 on front end 58b of rear extended part 58. Also on rear end 61a of central extended part 61 is tailpiece 63 which includes transverse hole 64. Front end 65 of central extended part 61 includes two holes 148, 149 and two aligned holes 150, 151. The aligned holes 150, 151 constitute a transverse axis half hinge.

As mentioned above, tow bar assembly 57 may also include front part 68, right linking part 141, left linking part 142, hitch 71, and a support jack 136. Front part 68 includes two holes 69 in its right side, two holes 70 in its left side, and the hitch 71 for towing by a tractor. Right linking part 141 includes two vertical holes 143 with the same center distance as the two holes 69 in front part 68, a transverse hole 145, and a transverse pin 72 which can be inserted in the hole 150 of front end 65 of central extended part 61. Left linking part 142 includes two vertical holes 144 with the same center distance as the two holes 70 in front part 68, a transverse hole 146, and a transverse pin 73 which can be inserted in the hole 151 of front end 65 of central extended part 61. Support jack 136 is attached to central extended part 61.

To assemble the right and left linking parts 141, 142, respectively, to front part 68 and central extended part 61, two screws 165 are inserted in the holes 143 of right linking part 141 and holes 69 of front part 68. The two screws 166 are inserted in the holes 144 of left linking part 142 and holes 70 of front part 68. As described previously, transverse pin 72 of right linking part 141 is inserted in the hole 150 of front end 65 of central extended part 61 and transverse pin 73 of left linking part 142 is inserted in the hole 151 of front end 65 of central extended part 61. The screw 153 is inserted in the hole 148 of central extended part 61 and hole 145 of right linking part 141 and the screw 154 is inserted in the hole 149 of central extended part 61 and hole 146 of left linking part 142.

While it is possible to rigidly lock together front part 68 and central extended part 61, as described above, it is also possible to couple them to allow front part 68 to freely rotate around pins 72 and 73 by removing screws 153 and 154.

To assemble rear extended part 58 to central extended part 61, pin 74 is inserted in the holes 62 of rear end 61a of central extended part 61 and through bushing 59 of front end 58b of rear extended part 58. As will be further explained, the arrow 140 indicates the direction in which the central extended part 61 rotates in relation to the rear extended part 58, with the center of rotation located at the hinge formed by the holes 62, the bushing 59, and the pin 74. Central extended part 61 may rotate with respect to rear extended part 58 in reaction to a force applied by the tow bar assembly positioning apparatus, as will be explained below.

Tow bar assembly positioning apparatus can also be seen in FIG. 3. Tow bar assembly positioning apparatus may include an actuator, which may also be a single-acting hydraulic cylinder 76, and a fine adjustment hand crank 79. Hydraulic cylinder 76 activates a partially threaded rod 78 which rotates in relation to cylinder 76 around its own longitudinal axis. Hydraulic tube 77 supplies hydraulic fluid to cylinder 76 for operating cylinder 76. Hydraulic tube 77 may be joined through a T-type fitting to hydraulic tube 49 which supplies hydraulic fluid to cylinder 47 of the hay rake positioning apparatus.

To couple the tow bar assembly positioning apparatus to the tow bar assembly, single-acting hydraulic cylinder 76 includes a pin 66 which is inserted into hole 60 in the front end 58b of rear extended part 58. The partially threaded rod 78 is inserted into the threaded hole 75 which is included in pin 67. Pin 67 is inserted into the transverse hole 64 of tail piece 63 at rear end 61a of central extended part 61.

Arrow 139 indicates the direction in which the single-acting hydraulic cylinder 76 functions when it is activated to move the threaded rod 78. As mentioned above, arrow 140 indicates the direction in which the central extended part 61 rotates in relation to the rear extended part 58. Central extended part 61 rotates in reaction to the thrust of rod 78 when the single-acting hydraulic cylinder 76 is operated in the direction of the arrow 139. As discussed above, rod 78 is coupled to pin 67 which is coupled to tailpiece 63 of central extended part 61. The partially threaded rod 78 may include a fine adjustment crank 79 for adjusting the length of threaded rod 78 relative to cylinder 76.

Figure 4:
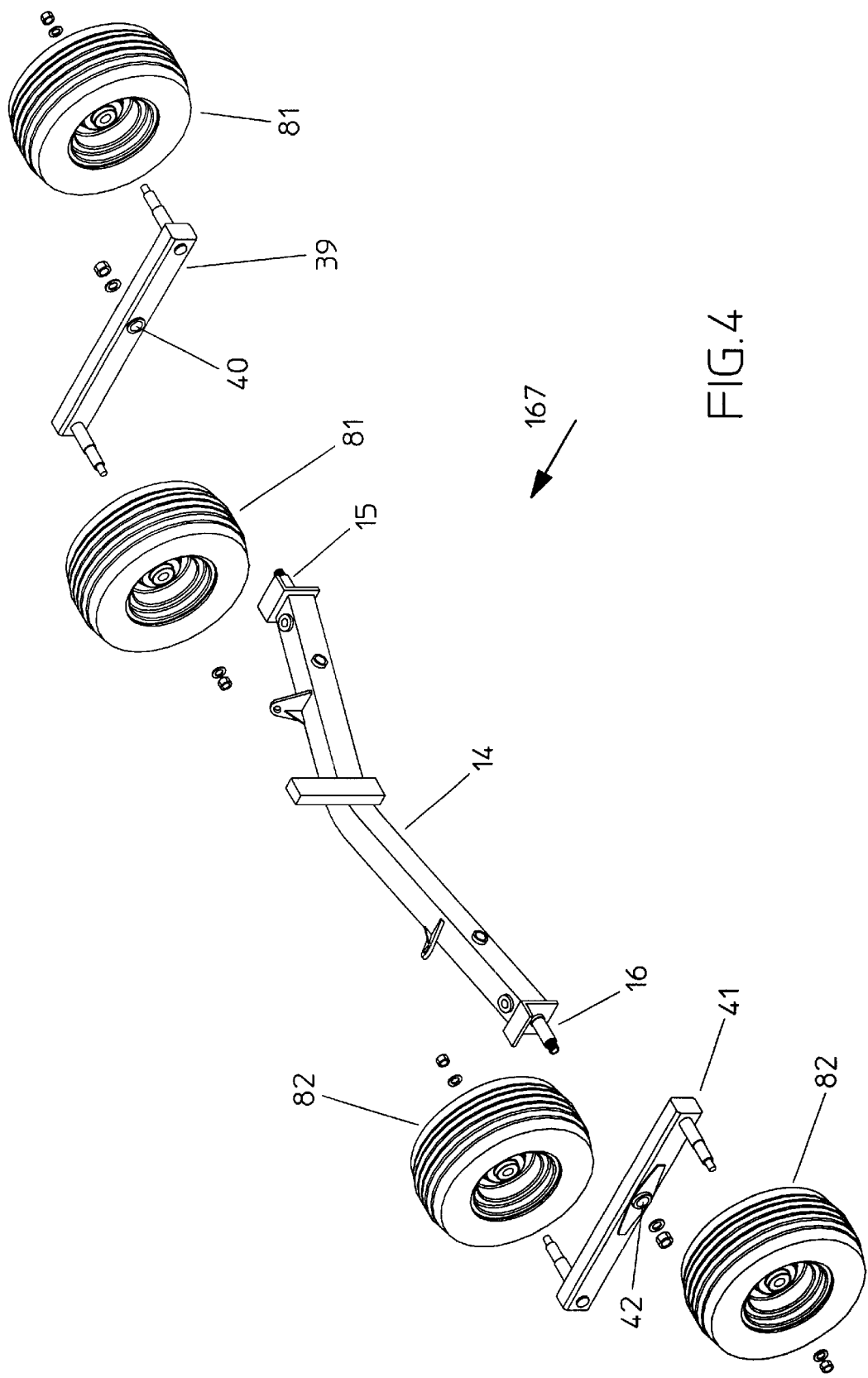
FIG. 4 is a disassembled perspective view of the carriage assembly of FIG. 1.

FIG. 4 illustrates an embodiment for a carriage assembly that supports the hay rake assembly. The carriage assembly includes a right carriage 39 and a left carriage 41. Right carriage 39 includes two tandem wheels 81 and a coupling hole 40. Similarly, left carriage 41 includes two tandem wheels 82 and a coupling hole 42. The carriage assembly is coupled to the support frame 5 by inserting transverse pin 15 included on the right end of lower transverse extended part 14 into coupling hole 40 of right carriage 39 and by inserting transverse pin 16 included on the left end of lower transverse extended part 14 into coupling hole 42 of left carriage 41.

The operation of the first embodiment of the hay rake assembly positioning apparatus will now be described with reference to FIGS. 5, 6, 7, and 8. As explained previously, the gearbox 1, the tow bar assembly 57, the tow bar assembly positioning apparatus, and the hay rake positioning apparatus are assembled. Thus, vertical mobile rod 50 is inserted through the central vertical throughhole 48 of the central nonrotating part 2 of the gearbox 1. Upper end 51 of rod 50 is connected to hydraulic cylinder 47, which is mounted above gearbox 1. Lower end 52 of rod 50 is connected to lower central part 11 of support frame 5. Rear extended part 58 of tow bar assembly 57 is coupled to central extended part 61 and is also attached to gearbox 1. The tow bar assembly positioning apparatus, which includes single-acting hydraulic cylinder 76, is coupled to the tow bar assembly as previously described. The carriage assembly is coupled to the support frame 5.

FIGS. 5 and 6 illustrate the hay rake assembly in its lower working position. When the single-acting hydraulic cylinders 47 and 76 are at rest, i.e., not pressurized with hydraulic fluid, the weight of the various parts of the hay rake assembly push down on the positioning apparatuses, i.e., the tow bar assembly positioning apparatus and the hay rake positioning apparatus, and therefore, the hay rake assembly assumes the lower work position as shown in FIGS. 5 and 6.

When, due to the height of the hitch 71 when it is attached to a tractor for towing of the hay rake assembly, the trim of the hay rake is not substantially parallel to the ground, its longitudinal inclination can be corrected by changing the relative position of the central extended part 61 with respect to the rear extended part 58 of the tow bar assembly 57 by operating the fine adjustment crank 79 to adjust the extended length of partially threaded rod 78.

To raise the hay rake to its upper maneuvering and transport position, as illustrated in FIGS. 7 and 8, hydraulic pressure is applied to single-acting hydraulic cylinder 47. When the single-acting hydraulic cylinder 47 is operated by supplying hydraulic fluid to the cylinder 47 through hydraulic tube, or circuit, 49, the cylinder moves in the direction of the arrow 128 to push mobile vertical rod 50, which is connected to it, in the direction of the arrow 137. Thus, rod 50 moves the lower central part 11 of support frame 5 away from the gearbox 1 which in-turn causes support frame 5, due to its internal articulations, the connecting rods, and the previously described hinges, to change its shape and move the gearbox 1 away from the ground which simultaneously moves the rake arms 4 in the direction of the arrow 141.

When the single-acting hydraulic cylinder 76 of the tow bar assembly 57 is operated by means of the hydraulic tube, or circuit, 77, the cylinder 76 pushes the threaded rod 78 in the direction of the arrow 139. Thus, rod 78, through interaction with pin 67, which is inserted within hole 64 in tailpiece 63 of central extended part 61, pushes tailpiece 63 which causes the central extended part 61 to rotate in the direction of the arrow 140 with respect to the rear extended part 58 which causes the tow bar assembly 57 to change its shape. Thus, by adjusting the orientation of the first end, or central extended part 61, of the tow bar assembly 57 with respect to the second end, or rear extended part 58, of the tow bar assembly, the second end is raised to position the gearbox 1 in a parallel orientation with the ground surface.

The combination of the two movements described above in the direction of the arrows 140 and 141 causes the hay rake assembly to assume the raised position for maneuvering and transport as illustrated in FIGS. 7 and 8.

The combination of the two above-described movements causes the hay rake assembly to maintain a substantially parallel position with respect to the ground even while in the raised position, thus guaranteeing that the assembly's trim will be optimal in every circumstance.

As can be understood, to return the hay rake assembly to its lower position from its raised position, when hydraulic pressure is relieved from the single-acting cylinders 47 and 76, the weight of the various parts of the hay rake assembly push down on the positioning apparatuses which cause them to carry out all the movements described above in reverse order. Therefore, the hay rake assembly again assumes the lower work position as shown in FIGS. 5 and 6.

It is contemplated in the present invention that the tow bar assembly positioning apparatus and the hay rake positioning apparatus may be either jointly operated, e.g., simultaneously controlled by an operator with a single control signal, or operated independent of each other by separately controlling each positioning apparatus. In either situation, the operator is able to easily control the positioning of the hay rake assembly by operating, for example, a remote control switch(es) in the cab of the towing tractor that controls the hydraulic fluid flow to the two positioning apparatuses, as is well-known in the art. Thus, there is no need for the operator to get down from the tractor and approach the hay rake to operate it or adjust its positioning.

Figure 9:
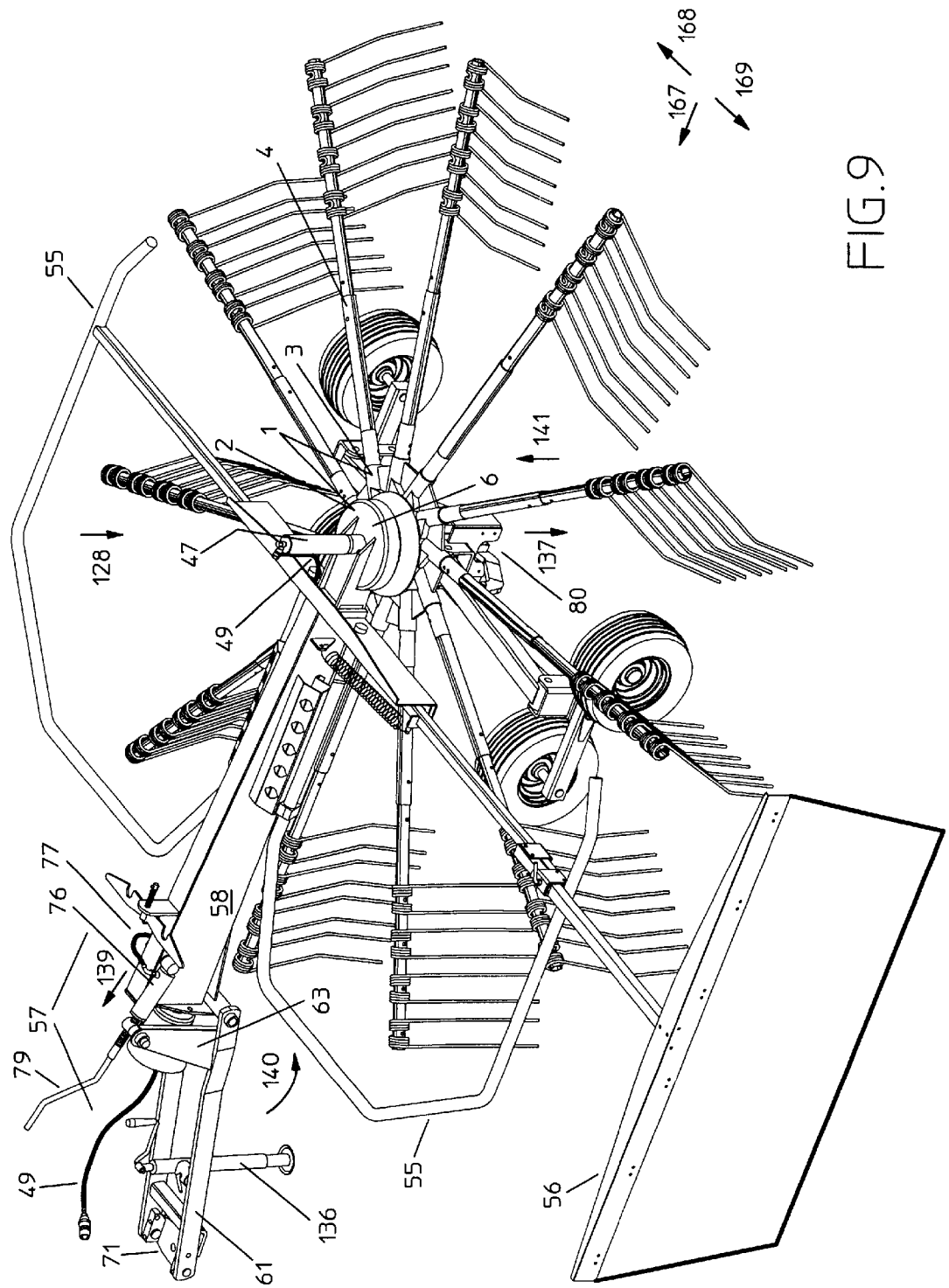
FIG. 9 is a perspective view of a hay rake assembly and a second embodiment of a hay rake assembly positioning apparatus in accordance with the principles of the present invention.

FIG. 9 illustrates a hay rake assembly and a second embodiment of a hay rake assembly positioning apparatus in accordance with the principles of the present invention. Like reference numerals are utilized in FIG. 9 where components which were previously described are also illustrated in FIG. 9. The only difference in the embodiment of FIG. 9 from the embodiment of FIG. 1 is the structure of the support frame 80. All other components and assemblies are configured as previously described and function in a similar manner.

Figure 10:
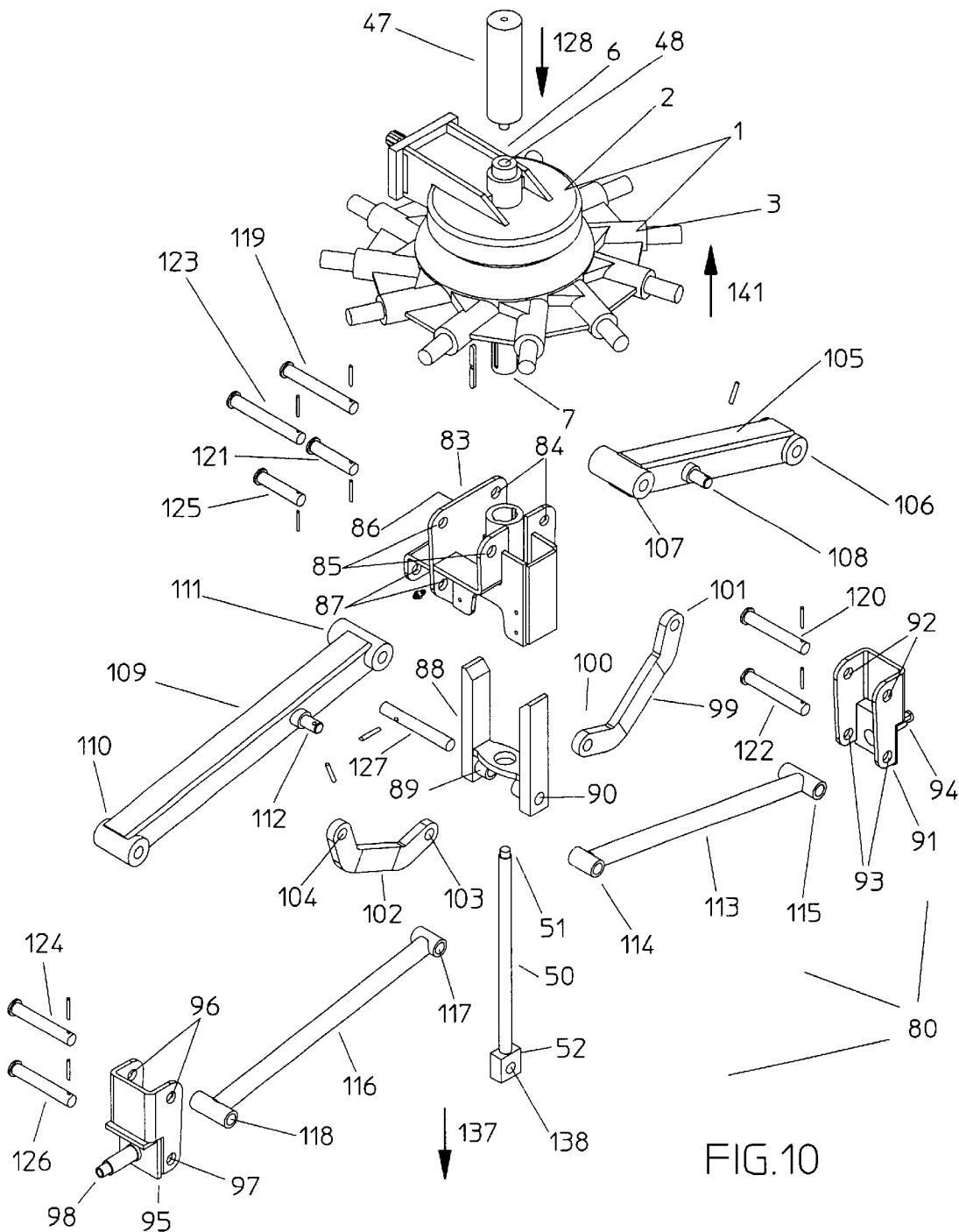
FIG. 10 is a disassembled perspective view of the hay rake positioning apparatus of FIG. 9.

Support frame 80 will be described in detail with reference to FIG. 10. Support frame 80 includes an upper central part 83 which is attached to the lower part 7 of the central nonrotating part 2 of the gearbox 1. Upper central part 83 has two aligned holes 84 in its upper right part, two aligned holes 85 in its upper left part, two aligned holes 87 in its lower left part, and two aligned holes 86 in its lower right part (not visible in FIG. 10 but which are defined nonetheless since they are symmetrical with holes 87) all of which constitute a half hinge with a longitudinal axis.

Also included in support frame 80 is a lower central part 88 that includes the two aligned bushings 89 and 90, each of which constitute a half hinge with a longitudinal axis. Right lateral part 91 has two aligned holes 92 in its upper part which constitute a half hinge with a longitudinal axis, two aligned holes 93 in its lower part which constitute a half hinge with a longitudinal axis, and a transverse pin 94 in its upper part. Left lateral part 95 is similarly formed with two aligned holes 96 in its upper part which constitute a half hinge with a longitudinal axis, two aligned holes 97 in its lower part which constitute a half hinge with a longitudinal axis (both of which are not visible in FIG. 10 but which are symmetrical to the holes 93 in right lateral part 91), and with a transverse pin 98 in its upper part.

A right central connecting rod 99 has a left end with a hole 100 which constitutes a half hinge that complements the half hinge consisting of the bushing 90 of lower central part 88 and a right end with a longitudinal hole 101. A left central connecting rod 102 has a right end with a hole 103 which constitutes a half hinge that complements the half hinge consisting of the bushing 89 of lower central part 88 and a left end with a longitudinal hole 104.

Upper right rod 105 has a left end with a bushing 107 which constitutes a half hinge that complements the half hinge consisting of the holes 84 of upper central part 83, a right end with a bushing 106 which constitutes a half hinge that complements the half hinge consisting of the holes 92 of right lateral part 91, and a central part that has a pin 108 which is inserted into the hole 101 of right central connecting rod 99.

Upper left rod 109 has a right end with a bushing 111 which constitutes a =half hinge that complements the half hinge consisting of the holes 85 of upper central part 83, a left end with a bushing 110 which constitutes a half hinge that complements the half hinge consisting of the holes 96 of left lateral part 95, and a central part that has a pin 112 which is inserted into the hole 104 of left central connecting rod 102.

Lower right rod 113 has a left end with a bushing 114 which constitutes a half hinge that complements the half hinge consisting of the holes 86 of upper central part 83 and a right end with a bushing 115 which constitutes a half hinge that complements the half hinge consisting of the holes 93 of right lateral part 91.

Lower left rod 116 has a right end with a bushing 117 which constitutes a half hinge that complements the half hinge consisting of the holes 87 of upper central part 83 and a left end with a bushing 118 which constitutes a half hinge that complements the half hinge consisting of the holes 97 of left lateral part 95.

Pins 119, 120, 121, 122, 123, 124, 125, 126, and 127 are utilized to connect the various components of support frame 80 together. Pin 119 is inserted through holes 84 of upper central part 83 and bushing 107 of upper right rod 105 to connect upper central part 83 to upper right rod 105. Pin 120 is inserted through holes 92 of right lateral part 91 and bushing 106 of upper right rod 105 to connect right lateral part 91 to upper right rod 105. Pin 121 is inserted through holes 86 of upper central part 83 and bushing 114 of lower right rod 113 to connect upper central part 83 to lower right rod 113. Pin 122 is inserted through holes 93 of right lateral part 91 and bushing 115 of lower right rod 113 to connect right lateral part 91 to lower right rod 113. Pin 123 is inserted through holes 85 of upper central part 83 and bushing 111 of upper left rod 109 to connect upper central part 83 to upper left rod 109. Pin 124 is inserted through holes 96 of left lateral part 95 and bushing 110 of upper left rod 109 to connect left lateral part 95 to upper left rod 109. Pin 125 is inserted through holes 87 of upper central part 83 and bushing 117 of lower left rod 116 to connect upper central part 83 to lower left rod 116. Pin 126 is inserted through holes 97 of left lateral part 95 and bushing 118 of lower left rod 116 to connect left lateral part 95 to lower left rod 116. Lastly pin 127 is inserted through bushing 90 of lower central part 88, hole 100 of right central connecting rod 99, hole 138 in the lower end 52 of vertical mobile rod 50, hole 103 in left central connecting rod 102, and through bushing 89 of lower central part 88. Thus, vertical mobile rod 50 is connected to lower central part 88 which is in-turn connected to right central connecting rod 99 and left central connecting rod 102. Vertical mobile rod 50 extends up through upper central part 83 and central vertical throughhole 48 of central nonrotating part 2 of gearbox 1 where its upper end 51 is attached to cylinder 47. The interconnection of the different components of support frame 80 can be further seen in FIGS. 12 and 14.

The embodiment of the carriage assembly illustrated in FIG. 4 can also be utilized with support frame 80. The carriage assembly is coupled to support frame 80 by inserting the transverse pin 94 included on the right lateral part 91 into coupling hole 40 of right carriage 39 and by inserting transverse pin 98 included on the left lateral part 95 into coupling hole 42 of left carriage 41.

The operation of the second embodiment of the hay rake assembly positioning apparatus will now be described with reference to FIGS. 11, 12, 13, and 14. As explained previously, the gearbox 1, the tow bar assembly 57, the tow bar assembly positioning apparatus, and the hay rake positioning apparatus are assembled. Thus, vertical mobile rod 50 is inserted through the central vertical throughhole 48 of the central nonrotating part 2 of the gearbox 1. Upper end 51 of rod 50 is connected to hydraulic cylinder 47, which is mounted above gearbox 1. Lower end 52 of rod 50 is connected to lower central part 88 of support frame 80. Tow bar assembly 57 and the tow bar assembly positioning apparatus are formed and function as previously described. Additionally, the carriage assembly is coupled to support frame 80 as described above.

Figure 11:
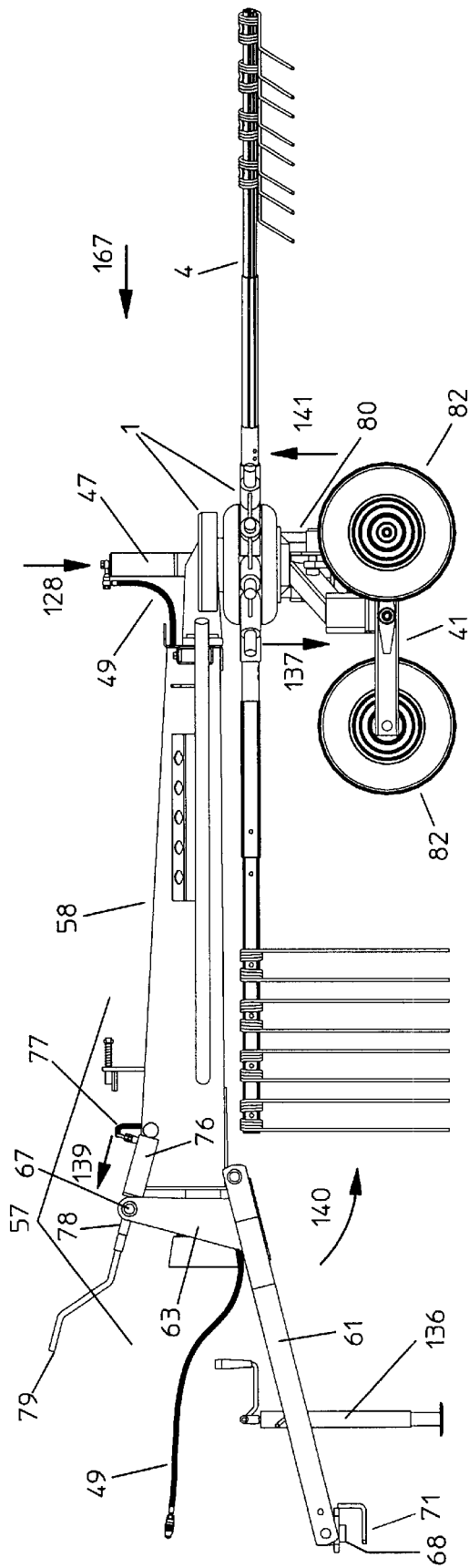
FIG. 11 is a side view of the hay rake assembly of FIG. 9 as positioned in a lower working position.
Figure 12:
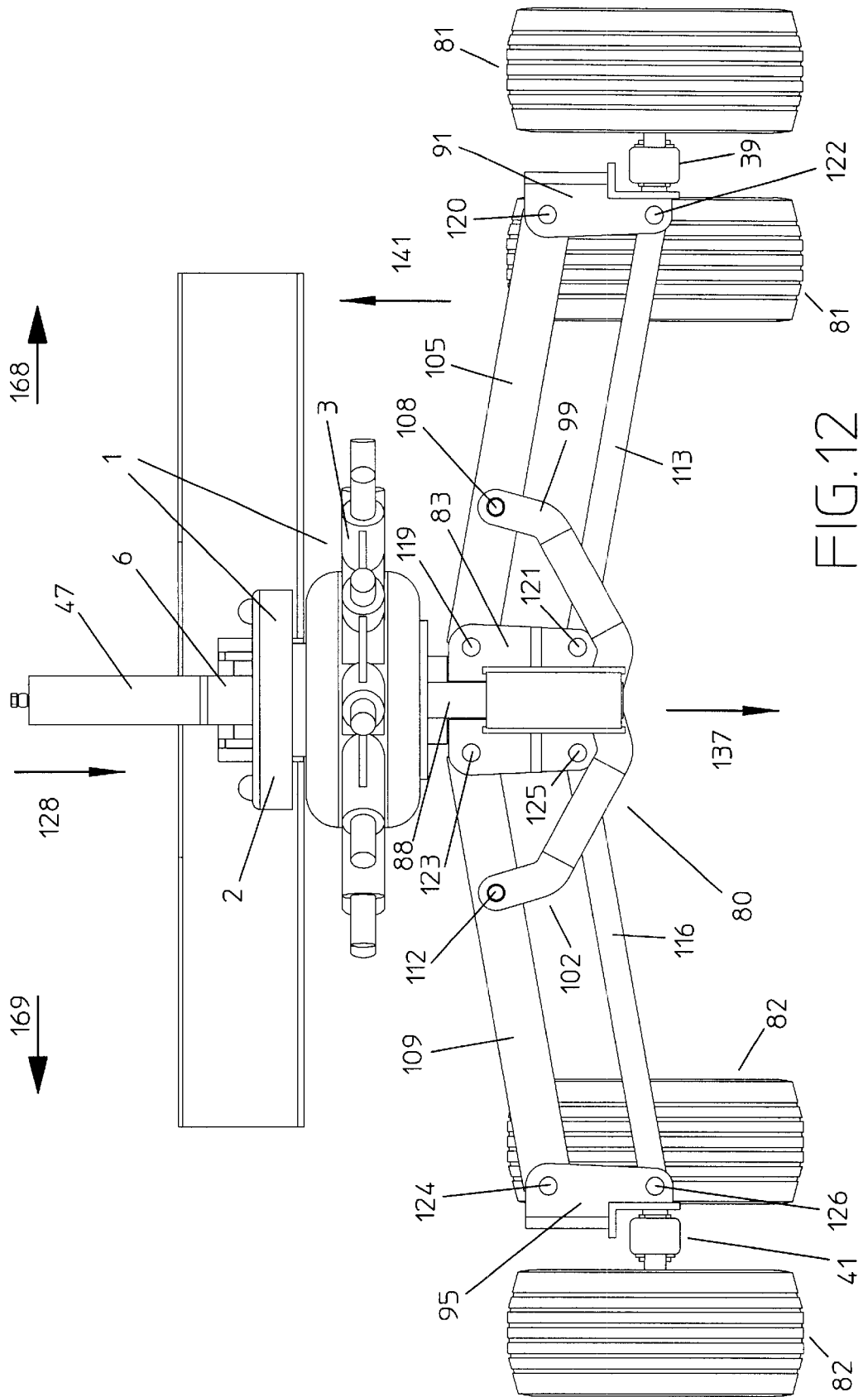
FIG. 12 is a rear view of the hay rake assembly of FIG. 11.

FIGS. 11 and 12 illustrate the hay rake assembly in its lower working position. Again, as was described previously for the embodiment of FIGS. 5 and 6, when the single-acting hydraulic cylinders 47 and 76 are at rest, i.e., not pressurized with hydraulic fluid, the weight of the various parts of the hay rake assembly push down on the positioning apparatuses, i.e., the tow bar assembly positioning apparatus and the hay rake positioning apparatus, and therefore, the hay rake assembly assumes the lower work position as shown in FIGS. 11 and 12.

Figure 13:
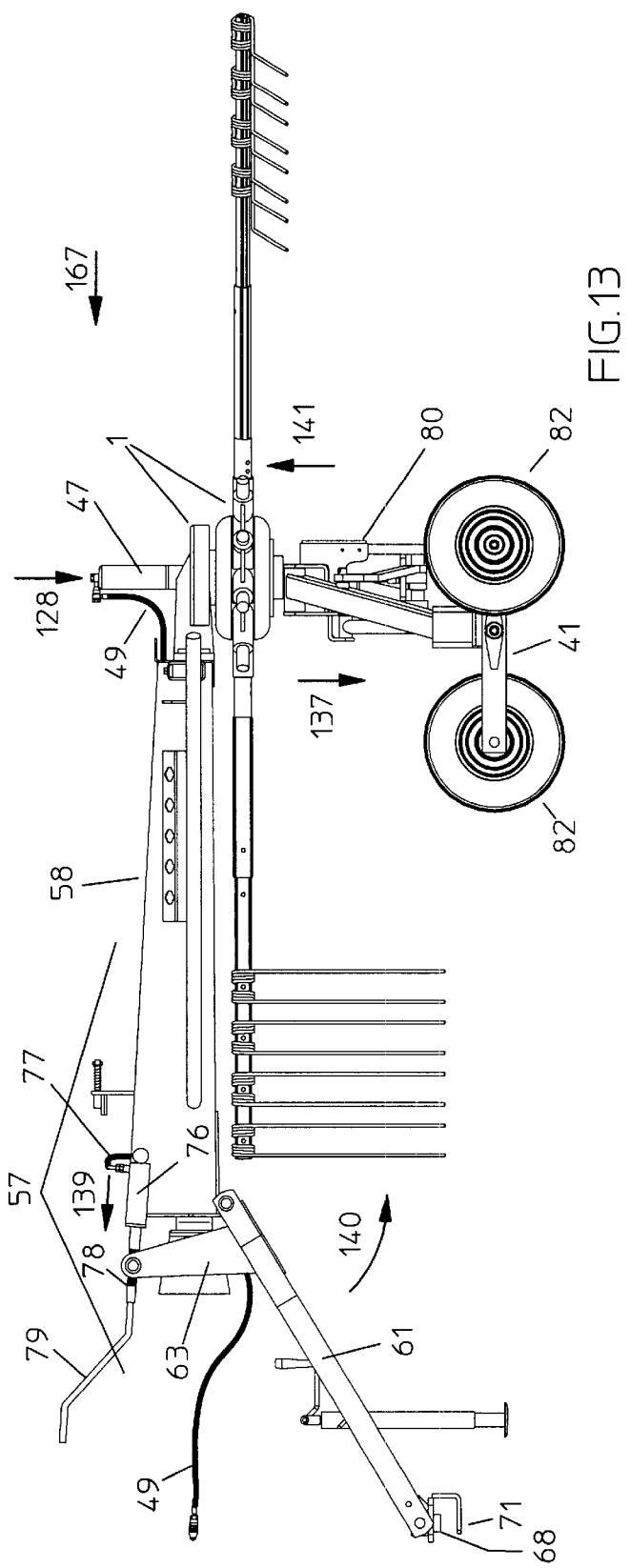
FIG. 13 is a side view of the hay rake assembly of FIG. 9 as positioned in an upper maneuvering and transport position.
Figure 14:
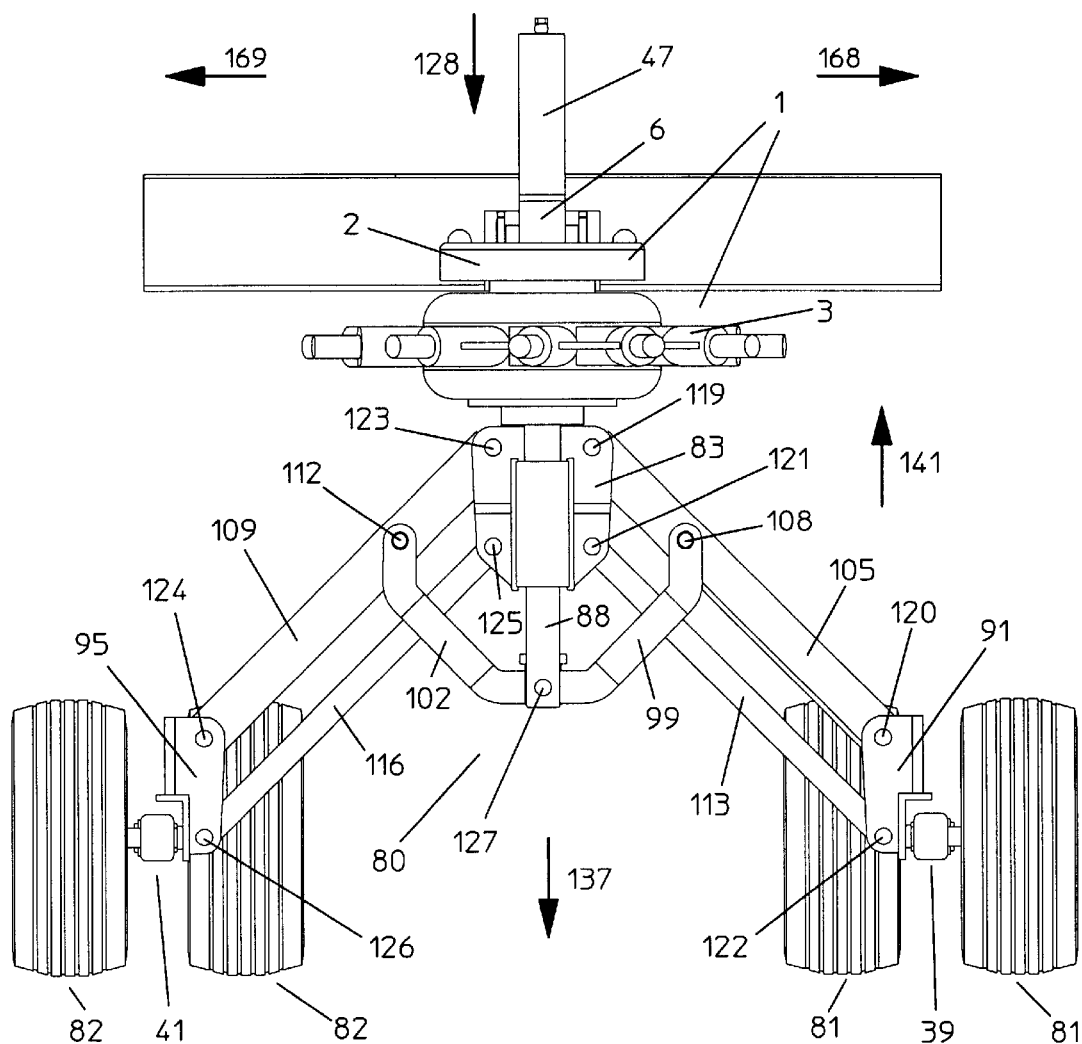
FIG. 14 is a rear view of the hay rake assembly of FIG. 13.

As was previously described, to raise the hay rake to its maneuvering and transport position, as illustrated in FIGS. 13 and 14, hydraulic pressure is applied to single-acting hydraulic cylinder 47. The cylinder moves in the direction of the arrow 128 to push mobile vertical rod 50, which is connected to it, in the direction of the arrow 137. Thus, rod 50 moves the lower central part 88 of support frame 80 away from gearbox 1 which in-turn causes support frame 80, due to its internal articulations, the connecting rods, and the previously described hinges, to change its shape and move gearbox 1 away from the ground which simultaneously moves the rake arms 4 in the direction of the arrow 141.

Movement, or adjustment, of the tow bar assembly 57 by utilizing single-acting hydraulic cylinder 76, is performed as previously described.

Thus, as with the previously described embodiment, the combination of the two movements described above in the direction of the arrows 140 and 141 causes the hay rake assembly to assume its upper position for maneuvering and transport as illustrated in FIGS. 13 and 14.

As discussed previously, the combination of the two above-described movements causes the hay rake assembly to maintain a substantially parallel position with respect to the ground even while in the raised position, thus guaranteeing that the assembly's trim will be optimal in every circumstance.

The hay rake assembly can be returned to its lower position from its raised position by utilizing the method described previously.

Several alternatives on the disclosed embodiments are contemplated. In one alternative, which can be utilized with all of the previously disclosed embodiments, the carriage assembly includes a single right wheel and a single left wheel. As can be seen in FIG. 15, a single right wheel 43, which includes a rotating hub 53, can be applied to transverse pin 15 of lower transverse extended part 14 of support frame 5 by means of the coupling hole 44 in hub 53. Additionally, a single left wheel 45, which includes the rotating hub 54, can be applied to transverse pin 16 of lower transverse extended part 14 by means of the coupling hole 46 in hub 54. Alternatively, single right wheel 43 can be applied to transverse pin 94 of right lateral part 91 of support frame 80 and single left wheel 45 can be applied to transverse pin 98 of left lateral part 95.

In another alternative embodiment, which can be utilized with all of the previously disclosed embodiments, one or both of the single-acting hydraulic cylinders 47 and 76 can be replaced by double-acting hydraulic cylinders. By utilizing double-acting hydraulic cylinders, the downward movement of the positioning apparatuses which returns the hay rake assembly to its lower working position could be effected by not only the weight of the various parts of the hay rake assembly, as described previously, but additionally can also be effected by operating the cylinders in the reverse direction to that which was described previously for the hoisting movement.

Additionally, one or both of the single-acting hydraulic cylinders 47 and 76 can be replaced by other types of known hydraulic apparatuses to accomplish the same function, such as, for example, those types that are based on combining hydraulic motors with screw apparatuses.

The disclosed embodiments are illustrative of the various ways in which the present invention may be practiced. Other embodiments can be implemented by those skilled in the art without departing from the spirit and scope of the present invention. For example, it is possible to widely vary, with respect to what is described and illustrated herein, the geometric details, the shape, the mechanical and hydraulic components known to technicians in this field, the construction details, and the points where the hydraulic cylinders are attached. Additionally, for example, it is possible to utilize the present invention with a variety of different designs for the gearbox and the rake arms, both of which have many suitable types that are known to the technicians in this field, and the support frame. Also, the present invention is not limited to use with any particular construction details for the carriage assembly and the design and number of wheels that are included in the carriage assembly.

What is claimed is:

1. A rotary hay rake comprising:
   a gearbox having a central nonrotating part with a bore disposed therethrough, and a peripheral rotating part, peripherally and rotatably mounted to the central nonrotating part, for rotating at least one rake arm;
   an actuator mounted above said gearbox;
   a support frame mounted below said gearbox and moveable between a lower operating position and an upper maneuvering and transport position; and a
   a connecting member disposed within the bore and coupled to both said actuator and said support frame, said connecting member being moveable in at least a first and second direction;
   wherein said actuator, acting on said connecting member, serves to move said support frame between the lower operating position and the upper transport position and any position in between, and
   wherein said actuator is a hydraulic cylinder.

2. The apparatus of claim 1 wherein said hydraulic cylinder is a single-acting hydraulic cylinder.

3. The apparatus of claim 1 wherein said hydraulic cylinder is a double-acting hydraulic cylinder.

4. The apparatus of claim 1 wherein said connecting member is a rod.

5. The apparatus of claim 1 wherein said support frame includes a carriage assembly, wherein said carriage assembly has a right carriage and a left carriage, each of said right and left carriages including a wheel.

6. The apparatus of claim 5 wherein each of said right and left carriages include two wheels.

7. The rotary hay rake of claim 1 wherein said support frame moves to the upper maneuvering and transport position when said connecting member moves in one direction and to the lower operating position when said connecting member moves in the other direction.

8. The rotary hay rake of claim 1 wherein said support frame and connecting member move in opposite directions when said actuator acts on said connecting member.

9. The rotary hay rake of claim 1 wherein said support frame moves to the upper maneuvering and transport position when said connecting member moves downwardly and to the lower operating position when said connecting member moves upwardly.

10. A rotary hay rake comprising:
   a gearbox having a central nonrotating part with a bore disposed therethrough, and a peripheral rotating part, peripherally and rotatably mounted to the central nonrotating part, for rotating at least one rake arm;
   an actuator mounted above said gearbox;
   a support frame mounted below said gearbox and moveable between a lower operating position and an upper maneuvering and transport position; and
   a connecting member disposed within the bore and coupled to both said actuator and said support frame, said connecting member being moveable in at least a first and second direction;
   wherein said actuator, acting on said connecting member, serves to move said support frame between the lower operating position and the upper transport position and any position in between, and
   wherein said actuator includes a hydraulic motor and a screw.

11. A rotary hay rake comprising:
   a gearbox having a central nonrotating part with a bore disposed therethrough, and a peripheral rotating part, peripherally and rotatably mounted to the central nonrotating part, for rotating at least one rake arm;
   an actuator mounted above said gearbox;
   a support frame mounted below said gearbox and moveable between a lower operating position and an upper maneuvering and transport position;
   a connecting member disposed within the bore and coupled to both said actuator and said support frame, said correcting member being moveable in at least a first and second direction; and
   a tow bar assembly further comprising:
   a rear extended part, said rear extended part having a first end and a second end, said first end connected to structure associated with said gearbox; and
   a central extended part, said central extended part having a first end and a second end, said second end coupled to said second end of said rear extended part and said central extended part movable with respect to said rear extended part;
   said rear extended part positionable at a first lower position and a second upper position as a result of movement of said central extended part,
   wherein said actuator, acting on said connecting member, serves to move said support frame between the lower operating position and the upper transport position and any position in between.

12. The apparatus of claim 11 further comprising:
   a second actuator, wherein said second actuator is attached at a first end to said rear extended part and coupled to said central extended part at a second end and wherein said rear extended part is positioned in said second upper position in response to a force imparted to said central extended member by said second actuator.

13. The apparatus of claim 12 wherein said second actuator is a hydraulic cylinder.

14. The apparatus of claim 13 wherein said hydraulic cylinder is a single-acting hydraulic cylinder.

15. The apparatus of claim 13 wherein said hydraulic cylinder is a double-acting hydraulic cylinder.

16. The apparatus of claim 12 wherein said actuator and said second actuator are jointly controlled.

17. The apparatus of claim 12 wherein said actuator and said second actuator are independently controlled.

18. The apparatus of claim 12 wherein said second actuator includes a hydraulic motor and a screw.

19. The apparatus of claim 12 further comprising a hand-operated crank coupled to said second actuator.

20. The apparatus of claim 11 further comprising a hitch, said hitch coupled to said first end of said central extended part.

21. The apparatus of claim 11 further comprising a front part, said front part including a hitch and coupled to said first end of said central extended part.

22. The apparatus of claim 21 wherein said front part is rigidly coupled to said first end of said central extended part.

23. The apparatus of claim 12 wherein when said support frame is in its second upper position and said rear extended part is in its second upper position, said gearbox and rake arms are positioned parallel to a ground surface.

24. An apparatus for positioning a hay rake, the hay rake including a gearbox with a central nonrotating part, a peripheral rotating part, and rake arms attached to the peripheral rotating part, the central nonrotating part defining a bore therethrough, comprising:
   an actuator, said actuator mounted above said gearbox;
   a support frame, said support frame mounted below said gearbox and movable between a first lower position and a second upper position, said support frame including:
      an upper central part, said upper central part coupled to a lower end of said gearbox and defining a central bore therethrough, said connecting member extending through said bore;
      a lower central part, said lower central part slidably received within said upper central part and coupled to said lower end of said connecting member;
      a right central connecting rod, said right central connecting rod having a first end and a second end and said right central connecting rod coupled at its first end to said lower central part;
      a left central connecting rod, said left central connecting rod having a first end and a second end and said left central connecting rod coupled at its first end to said lower central part;
      an upper right rod, said upper right rod having a first end, a second end, and a transverse pin disposed between said first end and said second end, said first end coupled to said upper central part and said transverse pin received within a bore defined by said second end of said right central connecting rod;
      an upper left rod, said upper left rod having a first end, a second end, and a transverse pin disposed between said first end and said second end, said first end coupled to said upper central part and said transverse pin received within a bore defined by said second end of said left central connecting rod;
      a right lateral connecting rod, said right lateral connecting rod having a first end and a second end, said second end coupled to said second end of said upper right rod;

a left lateral connecting rod, said left lateral connecting rod having a first end and a second end, said second end coupled to said second end of said upper left rod; and a lower transverse extended part, said lower transverse extended part having a right side and a left side, said first end of said right lateral connecting rod coupled to said right side of said lower transverse extended part and said first end of said left lateral connecting rod coupled to said left side of said lower transverse extended part;

a connecting member, said connecting member disposed through said bore of said central nonrotating part of said gearbox and having an upper end coupled to said actuator and a lower end coupled to said support frame;

said support frame movable to said second upper position in response to a force imparted to it by said actuator through said connecting member.

25. The apparatus of claim 24 wherein said actuator is a hydraulic cylinder.

26. The apparatus of claim 25 wherein said hydraulic cylinder is a single-acting hydraulic cylinder.

27. The apparatus of claim 25 wherein said hydraulic cylinder is a double-acting hydraulic cylinder.

28. The apparatus of claim 24 wherein said connecting member is a rod.

29. The apparatus of claim 24 wherein said actuator includes a hydraulic motor and a screw.

30. The apparatus of claim 24 wherein said support frame includes a carriage assembly, wherein said carriage assembly has a right carriage and a left carriage, each of said right and left carriages including a wheel.

31. The apparatus of claim 30 wherein each of said right and left carriages include two wheels.

32. In combination with the apparatus of claim 24, a tow bar assembly comprising:

a rear extended part, said rear extended part having a first end and a second end, said first end connected to structure associated with said gearbox; and a central extended part, said central extended part having a first end and a second end, said second end coupled to said second end of said rear extended part and said central extended part movable with respect to said rear extended part;

said rear extended part positionable at a first lower position and a second upper position as a result of movement of said central extended part.

33. The apparatus of claim 32 further comprising:

a second actuator, wherein said second actuator is attached at a first end to said rear extended part and coupled to said central extended part at a second end and wherein said rear extended part is positioned in said second upper position in response to a force imparted to said central extended member by said second actuator.

34. The apparatus of claim 33 wherein said second actuator is a hydraulic cylinder.

35. The apparatus of claim 34 wherein said hydraulic cylinder is a single-acting hydraulic cylinder.

36. The apparatus of claim 34 wherein said hydraulic cylinder is a double-acting hydraulic cylinder.

37. The apparatus of claim 33 wherein said actuator and said second actuator are jointly controlled.

38. The apparatus of claim 33 wherein said actuator and said second actuator are independently controlled.

39. The apparatus of claim 33 wherein said second actuator includes a hydraulic motor and a screw.

40. The apparatus of claim 33 further comprising a hand-operated crank coupled to said second actuator.

41. The apparatus of claim 32 further comprising a hitch, said hitch coupled to said first end of said central extended part.

42. The apparatus of claim 32 further comprising a front part, said front part including a hitch and coupled to said first end of said central extended part.

43. The apparatus of claim 42 wherein said front part is rigidly coupled to said first end of said central extended part.

44. The apparatus of claim 33 wherein when said support frame is in its second upper position and said rear extended part is in its second upper position, said gearbox and said rake arms are positioned parallel to a ground surface.

45. An apparatus for positioning a hay rake, the hay rake including a gearbox with a central nonrotating part, a peripheral rotating part, and rake arms attached to the peripheral rotating part, the central nonrotating part defining a bore therethrough, comprising:

an actuator, said actuator mounted above said gearbox;

a support frame, said support frame mounted below said gearbox and movable between a first lower position and a second upper position, said support frame including:

an upper central part, said upper central part coupled to a lower end of said gearbox and defining a central bore therethrough, said connecting member extending through said bore;

a lower central part, said lower central part slidably received within said upper central part and coupled to said lower end of said connecting member;

a right central connecting rod, said right central connecting rod having a first end and a second end and said right central connecting rod coupled at its first end to said lower central part;

a left central connecting rod, said left central connecting rod having a first end and a second end and said left central connecting rod coupled at its first end to said lower central part;

an upper right rod, said upper right rod having a first end, a second end, and a transverse pin disposed between said first end and said second end, said first end coupled to an upper end of said upper central part and said transverse pin received within a bore defined by said second end of said right central connecting rod;

an upper left rod, said upper left rod having a first end, a second end, and a transverse pin disposed between said first end and said second end, said first end coupled to an upper end of said upper central part and said transverse pin received within a bore defined by said second end of said left central connecting rod;

a right lateral part, said right lateral part having an upper end and a lower end, said upper end coupled to said second end of said upper right rod;

a left lateral part, said left lateral part having an upper end and a lower end, said upper end coupled to said second end of said upper left rod;

a lower right rod, said lower right rod having a first end and a second end, said first end of said lower right rod coupled to a lower end of said upper central part and said second end coupled to said lower end of said right lateral part; and a lower left rod, said lower left rod having a first end and a second end, said first end of said lower left rod coupled to a lower end of said upper central part and said second end coupled to said lower end of said left lateral part;

a connecting member, said connecting member disposed through said bore of said central nonrotating part of said gearbox and having an upper end coupled to said actuator and a lower end coupled to said support frame;

said support frame movable to said second upper position in response to a force imparted to it by said actuator through said connecting member.

46. The apparatus of claim 45 wherein said actuator is a hydraulic cylinder.

47. The apparatus of claim 46 wherein said hydraulic cylinder is a single-acting hydraulic cylinder.

48. The apparatus of claim 46 wherein said hydraulic cylinder is a double-acting hydraulic cylinder.

49. The apparatus of claim 45 wherein said connecting member is a rod.

50. The apparatus of claim 45 wherein said actuator includes a hydraulic motor and a screw.

51. The apparatus of claim 45 wherein said support frame includes a carriage assembly, wherein said carriage assembly has a right carriage and a left carriage, each of said right and left carriages including a wheel.

52. The apparatus of claim 51 wherein each of said right and left carriages include two wheels.

53. In combination with the apparatus of claim 45, a tow bar assembly comprising:

a rear extended part, said rear extended part having a first end and a second end, said first end connected to structure associated with said gearbox; and a central extended part, said central extended part having a first end and a second end, said second end coupled to said second end of said rear extended part and said central extended part movable with respect to said rear extended part;

said rear extended part positionable at a first lower position and a second upper position as a result of movement of said central extended part.

54. The apparatus of claim 53 further comprising:

a second actuator, wherein said second actuator is attached at a first end to said rear extended part and coupled to said central extended part at a second end and wherein said rear extended part is positioned in said second upper position in response to a force imparted to said central extended member by said second actuator.

55. The apparatus of claim 54 wherein said second actuator is a hydraulic cylinder.

56. The apparatus of claim 55 wherein said hydraulic cylinder is a single-acting hydraulic cylinder.

57. The apparatus of claim 55 wherein said hydraulic cylinder is a double-acting hydraulic cylinder.

58. The apparatus of claim 54 wherein said actuator and said second actuator are jointly controlled.

59. The apparatus of claim 54 wherein said actuator and said second actuator are independently controlled.

60. The apparatus of claim 54 wherein said second actuator includes a hydraulic motor and a screw.

61. The apparatus of claim 54 further comprising a hand-operated crank coupled to said second actuator.

62. The apparatus of claim 53 further comprising a hitch, said hitch coupled to said first end of said central extended part.

63. The apparatus of claim 53 further comprising a front part, said front part including a hitch and coupled to said first end of said central extended part.

64. The apparatus of claim 63 wherein said front part is rigidly coupled to said first end of said central extended part.

65. The apparatus of claim 54 wherein when said support frame is in its second upper position and said rear extended part is in its second upper position, said gearbox and said rake arms are positioned parallel to a ground surface.

* * * * *